United States Patent
Wheatley et al.

(10) Patent No.: US 6,667,095 B2
(45) Date of Patent: *Dec. 23, 2003

(54) MULTICOMPONENT OPTICAL BODY

(75) Inventors: John A. Wheatley, Ascot (GB);
Timothy J. Nevitt, Red Wing, MN (US); William W. Merrill, White Bear Lake, MN (US); Michael F. Weber, Shoreview, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 53 days.

This patent is subject to a terminal disclaimer.

(21) Appl. No.: 09/769,971

(22) Filed: Jan. 25, 2001

(65) Prior Publication Data

US 2001/0009714 A1 Jul. 26, 2001

Related U.S. Application Data

(62) Division of application No. 09/006,118, filed on Jan. 13, 1998, now Pat. No. 6,207,260.

(51) Int. Cl.[7] .................. B32B 7/02; B32B 27/08; G02B 5/08; G02B 5/26; G02B 5/30
(52) U.S. Cl. ............... 428/212; 428/213; 428/220; 428/332; 428/426; 359/350; 359/352; 359/359; 359/483; 359/487; 359/494; 359/500; 359/577; 359/580; 359/584; 359/586; 359/838; 359/839
(58) Field of Search ................ 428/212, 480, 428/213, 426; 359/483, 485, 487, 494, 500, 577, 580, 584, 586, 350, 352, 359, 838, 839

(56) References Cited

U.S. PATENT DOCUMENTS

| 3,124,639 A | 3/1964 | Kahn ..................... 88/65 |
| 3,557,265 A | 1/1971 | Chisholm et al. ........ 264/47 |
| 3,610,729 A | 10/1971 | Rogers ................. 350/157 |

(List continued on next page.)

FOREIGN PATENT DOCUMENTS

| EP | 469 732 | 2/1992 | ........... G02B/1/04 |
| WO | WO 95/27919 | 4/1995 | ........... G02B/27/28 |
| WO | WO 95/17303 | 6/1995 | ........... B32B/7/02 |
| WO | WO 95/17691 | 6/1995 | ........... G02B/5/30 |
| WO | WO 95/17692 | 6/1995 | ........... G02B/5/30 |
| WO | WO 95/17694 | 6/1995 | |
| WO | WO 96/19346 | 6/1996 | ........... B32B/7/00 |
| WO | WO 96/19347 | 6/1996 | ........... B32B/7/02 |
| WO | WO 97/01774 | 1/1997 | ........... G02B/1/10 |
| WO | WO 97/01778 | 1/1997 | ........... G02B/5/28 |
| WO | WO 97/32226 | 9/1997 | ........... G02B/5/30 |

OTHER PUBLICATIONS

Schrenk et al., Nanolayer polymeric optical films, Tappi Journal, pp. 169–174, Jun., 1992.

*Primary Examiner*—Vivian Chen
(74) *Attorney, Agent, or Firm*—John A. Burtis; Bruce E. Black

(57) ABSTRACT

Multilayer polymeric films and other optical bodies are provided. The films, which have at least three layers of different composition in the optical repeating unit, reflect light in a first portion of the spectrum while transmitting light in a second portion of the spectrum, exhibit improved reflectivities at oblique angles, and can be designed to suppress one or more higher order harmonics of the main reflection band.

14 Claims, 5 Drawing Sheets

U.S. PATENT DOCUMENTS

| | | |
|---|---|---|
| 3,711,176 A | 1/1973 | Alfrey, Jr. et al. ............... 350/1 |
| 3,759,647 A | 9/1973 | Schrenk et al. ............. 425/131 |
| 3,773,882 A | 11/1973 | Schrenk ...................... 264/171 |
| 3,860,036 A | 1/1975 | Newman, Jr. ................ 138/45 |
| 3,884,606 A | 5/1975 | Schrenk ................... 425/133.5 |
| 4,446,305 A | 5/1984 | Rogers et al. .............. 528/348 |
| 4,520,189 A | 5/1985 | Rogers et al. .............. 528/331 |
| 4,521,588 A | 6/1985 | Rogers et al. .............. 528/363 |
| 4,525,413 A | 6/1985 | Rogers et al. .............. 428/212 |
| 4,720,426 A | 1/1988 | Englert et al. .............. 428/344 |
| 4,788,128 A | 11/1988 | Barlow ....................... 430/200 |
| 4,912,083 A | 3/1990 | Chapman et al. ........... 503/227 |
| 4,942,141 A | 7/1990 | DeBoer et al. ............. 503/227 |
| 4,948,776 A | 8/1990 | Evans et al. ................ 503/227 |
| 4,948,777 A | 8/1990 | Evans et al. ................ 503/227 |
| 4,948,778 A | 8/1990 | DeBoer ....................... 503/227 |
| 4,950,639 A | 8/1990 | DeBoer et al. ............. 503/227 |
| 4,950,640 A | 8/1990 | Evans et al. ................ 503/227 |
| 4,952,552 A | 8/1990 | Chapman et al. ........... 503/227 |
| 4,973,572 A | 11/1990 | DeBoer ....................... 503/227 |
| 5,019,480 A | 5/1991 | DeBoer et al. ............. 503/227 |
| 5,019,549 A | 5/1991 | Kellogg et al. ............. 503/227 |
| 5,034,303 A | 7/1991 | Evans et al. ................ 430/200 |
| 5,035,977 A | 7/1991 | DeBoer et al. ............. 430/200 |
| 5,036,040 A | 7/1991 | Chapman et al. ........... 503/227 |
| 5,103,337 A | 4/1992 | Schrenk et al. ............. 359/359 |
| 5,188,760 A | 2/1993 | Hikmet et al. ......... 252/299.01 |
| 5,193,737 A | 3/1993 | Carraher .................... 228/157 |
| 5,196,393 A | 3/1993 | Kubodera et al. .......... 503/227 |
| 5,211,878 A | 5/1993 | Reiffenrath et al. .... 252/299.63 |
| 5,215,838 A | 6/1993 | Tam et al. .................... 430/41 |
| 5,233,465 A * | 8/1993 | Wheatley et al. ........... 359/359 |
| 5,235,443 A | 8/1993 | Barnik et al. ................. 359/37 |
| 5,262,894 A | 11/1993 | Wheatley et al. ........... 359/586 |
| 5,269,995 A | 12/1993 | Ramanathan et al. ....... 264/171 |
| 5,294,657 A | 3/1994 | Melendy et al. ............ 524/270 |
| RE34,605 E * | 5/1994 | Schrenk et al. ............. 359/359 |
| 5,316,703 A | 5/1994 | Schrenk ...................... 264/1.3 |
| 5,319,478 A | 6/1994 | Fijnfschilling et al. ........ 359/53 |
| 5,360,659 A | 11/1994 | Arends et al. .............. 428/216 |
| 5,389,324 A | 2/1995 | Lewis et al. ................. 264/171 |
| 5,448,404 A | 9/1995 | Schrenk et al. ............. 359/584 |
| 5,486,935 A | 1/1996 | Kalmanash .................. 359/37 |
| 5,486,949 A | 1/1996 | Schrenk et al. ............. 359/498 |
| 5,540,978 A | 7/1996 | Schrenk ...................... 428/212 |
| 5,568,316 A * | 10/1996 | Schrenk et al. ............. 359/584 |
| 5,612,820 A | 3/1997 | Schrenk et al. ............. 359/498 |
| 5,629,055 A | 5/1997 | Revol et al. .................... 428/1 |
| 5,686,979 A | 11/1997 | Weber et al. ................. 349/96 |
| 5,699,188 A | 12/1997 | Gilbert et al. .............. 359/584 |
| 5,721,603 A | 2/1998 | De Vaan et al. ............ 349/194 |
| 5,744,534 A | 4/1998 | Ishiharada et al. .......... 524/442 |
| 5,751,388 A | 5/1998 | Larson ........................ 349/96 |
| 5,767,935 A | 6/1998 | Ueda et al. ................. 349/112 |
| 5,770,306 A | 6/1998 | Suzuki et al. ............... 428/328 |
| 5,783,120 A | 7/1998 | Ouderkirk et al. .......... 264/134 |
| 5,793,456 A | 8/1998 | Broer et al. ................. 349/98 |
| 5,808,794 A | 9/1998 | Weber et al. ................ 359/487 |
| 5,825,542 A | 10/1998 | Cobb, Jr. et al. ........... 359/487 |
| 5,825,543 A | 10/1998 | Ouderkirk et al. .......... 359/494 |
| 5,965,247 A * | 10/1999 | Jonza et al. ................. 428/212 |
| 6,072,629 A * | 6/2000 | Fan et al. .................... 359/497 |
| 6,101,032 A * | 8/2000 | Wortman et al. ........... 359/500 |
| 6,207,260 B1 * | 3/2001 | Wheatley et al. ........... 428/212 |

\* cited by examiner

— P-Pol at 1350 nm
— S-Pol at 1350 nm

— P-Pol at 1350 nm
— S-Pol at 1350 nm

— P-Pol at 1350 nm
— S-Pol at 1350 nm

— P-Pol at 1350 nm
— S-Pol at 1350 nm

— Normal Angle Reflectance
····· 60 Degree S-pol Reflectance
····· 60 degree P-pol Reflectance
___ 60 Degree Reflectance for Unpolarized Light

MULTICOMPONENT OPTICAL BODY

This Application is a divisional of U.S. Ser. No. 09/006,118, filed Jan. 13, 1998, now U.S. Pat. No. 6,207,260.

FIELD OF THE INVENTION

The present invention relates generally to a multilayer polymeric films that reflect light in a first portion of the spectrum while transmitting light in a second portion of the spectrum, and in particular to a reflective polymeric film having at least three layers of different composition in the optical repeating unit.

BACKGROUND OF THE INVENTION

The use of multilayer films comprising multiple alternating layers of two or more polymers to reflect light is known and is described, for example, in U.S. Pat. No. 3,711,176 (Alfrey, Jr. et al.), U.S. Pat. No. 5,103,337 (Schrenk et al.), WO 96/19347, and WO 95/17303. The reflection and transmission spectra of a particular multilayer film depends primarily on the optical thickness of the individual layers. Optical thickness is defined as the product of the actual thickness of a layer and its refractive index. Accordingly, films can be designed to reflect infrared, visible or ultraviolet wavelengths $\lambda_M$ of light by appropriate choice of optical thickness of the layers in accordance with the following formula:

$$\lambda_M = (2/M)^* D_r \quad \text{(Formula I)}$$

wherein M is an integer representing the order of the reflected light, and $D_r$ is the optical thickness of an optical repeating unit (also called multilayer stack) comprising two or more polymeric layers. Accordingly, $D_r$ is the sum of the optical thicknesses of the individual polymer layers that make up the optical repeating unit. By varying the optical thickness of an optical repeating unit along the thickness of the multilayer film, a multilayer film can be designed that reflects light over a wide range of wavelengths.

From Formula I, it can also be seen that a multilayer film or optical body which is designed to reflect light in a first region of the spectrum may have higher order reflections in a second region of the spectrum. For example, a multilayer film designed to reflect infrared light will also have higher order reflections in the visible region of the spectrum. Specifically, a multilayer film designed to have a first order reflection (M=1) at 1500 nm may have higher order reflections at about 750 nm (M=2), 500 nm (M=3), 375 nm (M=4), etc. A film designed to reflect infrared light of even longer wavelengths may have even more higher order reflections in the visible region. Thus, for example, a multilayer film having a first order reflection at 2000 nm will have higher order reflections at 1000 nm, 666 nm, 500 nm, 400 nm, etc. These higher order reflections are undesirable in many applications (e.g., window films) because they impart an iridescent appearance to the film where a transparent, colorless appearance is preferred. Therefore, in order to design a multilayer film that reflects light over a first region of the spectrum (e.g., the infrared region) but does not reflect light over a shorter wavelength region (e.g., the visible region), at least two, and preferably at least three higher order reflections need to be suppressed.

U.S. Pat. No. 5,103,337 (Schrenk et al.) teaches that an infrared reflecting multilayer film having an optical repeating unit with polymeric layers A, B and C arranged in an order ABC, is capable of suppressing at least two successive higher order reflections when the index of refraction of polymeric layer B is chosen to be intermediate to that of polymeric layers A and C. In a particular embodiment of the film described therein, the optical repeating unit is formed by arranging layers A, B and C in an ABCB pattern. By selecting polymeric materials A, B and C such that the refractive index of material B equals the square root of the product of the refractive index of materials A and C, and by setting the optical thickness ratio for material A and C to ⅓ and that of material B to ⅙, at least three higher order reflections can be suppressed. Similar teachings are found in Thelen, A., J.Opt.Soc. Am. 53, 1266 (1963). However, one disadvantage of this design is that the amount of reflection of incident light with the first order harmonic decreases with increasing angle of incidence. A further disadvantage of this design is that the suppression of the three higher order reflections also decreases with increasing angle of incidence. This later result is particularly undesirable in applications such as window films where the infrared reflective film is used to shield a room from infrared sunlight, since the sunlight will frequently be incident at angles substantially away from the normal (particularly in the spring and summer when the sun is high in the sky).

U.S. Pat. No. 5,540,978 (Schrenk) teaches a multilayer polymeric film that reflects ultraviolet light. In one embodiment, the film includes first, second, and third diverse polymeric materials arranged in a repeating unit ABCB. In another embodiment, the layers are arranged in the repeating unit ABC.

WO 96/19346 teaches reflective films that are made out of an optical repeating unit of alternating layers A and B, where A is a birefringent polymeric layer and B can be either isotropic or birefringent. The reference notes that, by matching the index of refraction between both layers along an axis that is perpendicular to the surface of the film, the dependency of reflection on angle of incidence can be greatly reduced. However, the reference does not teach how these results can be extended to multilayer optical systems having three or more layer types in the repeating unit (e.g., films with ABC or ABCB repeating units). Such a system would be highly desirably, both because of the improvement in reflectivity at oblique angles it would afford, and because the additional layer or layers in the repeating unit could be used to impart better mechanical properties to the system. For example, one of the additional layers could be an optical adhesive that would reduce the tendency of the other layers to delaminate. Furthermore, while WO 96/19346 mentions infrared reflective films, it does not describe how an IR film can be made that will not suffer from higher order reflections in the visible region of the spectrum (e.g., if the first order reflection is at 1200 nm or more).

There is thus a need in the art for a multilayer film or other optical body that exhibits a first order reflection band for at least one polarization of electromagnetic radiation in a first region of the spectrum (e.g., in the infrared, visible or ultraviolet regions of the spectrum) but can be designed to suppress at least the second, and preferably also at least the third, higher order harmonics of the first reflection band. In particular, there is a need in the art for a multilayer film or optical body that has a first reflection band in the infrared region of the spectrum but that exhibits essentially no higher order reflection peaks in the visible region of the spectrum.

There is also a need in the art for a film or other optical body having three or more layer types in its optical repeating unit, and for which the reflectivity of the film (e.g., toward infrared radiation) remains essentially constant, or increases, at non-normal angles of incidence.

These and other needs are met by the films and optical bodies of the present invention, as hereinafter described.

SUMMARY OF THE INVENTION

In one aspect, the present invention provides films and other optical bodies which exhibit a first order reflection band for at least one polarization of electromagnetic radiation in a first region of the spectrum, while suppressing at least the second, and preferably also at least the third, higher order harmonics of the first reflection band.

In another aspect, the present invention provides a multilayer optical film having at least three different layer types in its optical; repeating unit, and for which the % reflection of the first order harmonic remains essentially constant, or increases, as a function of angle of incidence. This may be accomplished, for example, by forming at least a portion of the optical body out of polymeric materials A, B, and C which are arranged in a repeating sequence ABC, wherein A has refractive indices $n_x^A$, $n_y^A$, and $n_z^A$ along mutually orthogonal axes x, y, and z, respectively, B has refractive indices $n_x^B$, $n_y^B$, and $n_z^B$ along axes x, y and z, respectively, and C has refractive indices $n_x^C$, $n_y^C$ and $n_z^C$ along axes x, y, and z, respectively, where axis z is orthogonal to the plane of the film or optical body, wherein $n_x^A > n_x^B > n_x^C$ or $n_y^A > n_y^B > n_y^C$ and wherein $n_z^C \geq n_z^B$ and/or $n_z^B \geq n_z^A$. Preferably, at least one of the normalized differences $2(n_z^A - n_z^B)/(n_z^A + n_z^B)$ and $2(n_z^B - n_z^C)/(n_z^B + n_z^C)$ is less than about −0.03.

Surprisingly, it has been found that, by designing the film or optical body within these constraints, at least some combination of second, third and fourth higher-order reflections can be suppressed without a substantial decrease of the first harmonic reflection with angle of incidence, particularly when the first reflection band is in the infrared region of the spectrum. Films and optical bodies made in accordance with the present invention are therefore particularly useful as IR mirrors, and may be used advantageously as window films and in similar applications where IR protection is desired but good transparency and low color are important.

BRIEF DESCRIPTION OF THE DRAWINGS

The present invention is described in detail by way of reference to the following drawings, without, however, the intention to limit the invention thereto.

DETAILED DESCRIPTION OF THE INVENTION

Figure 1:
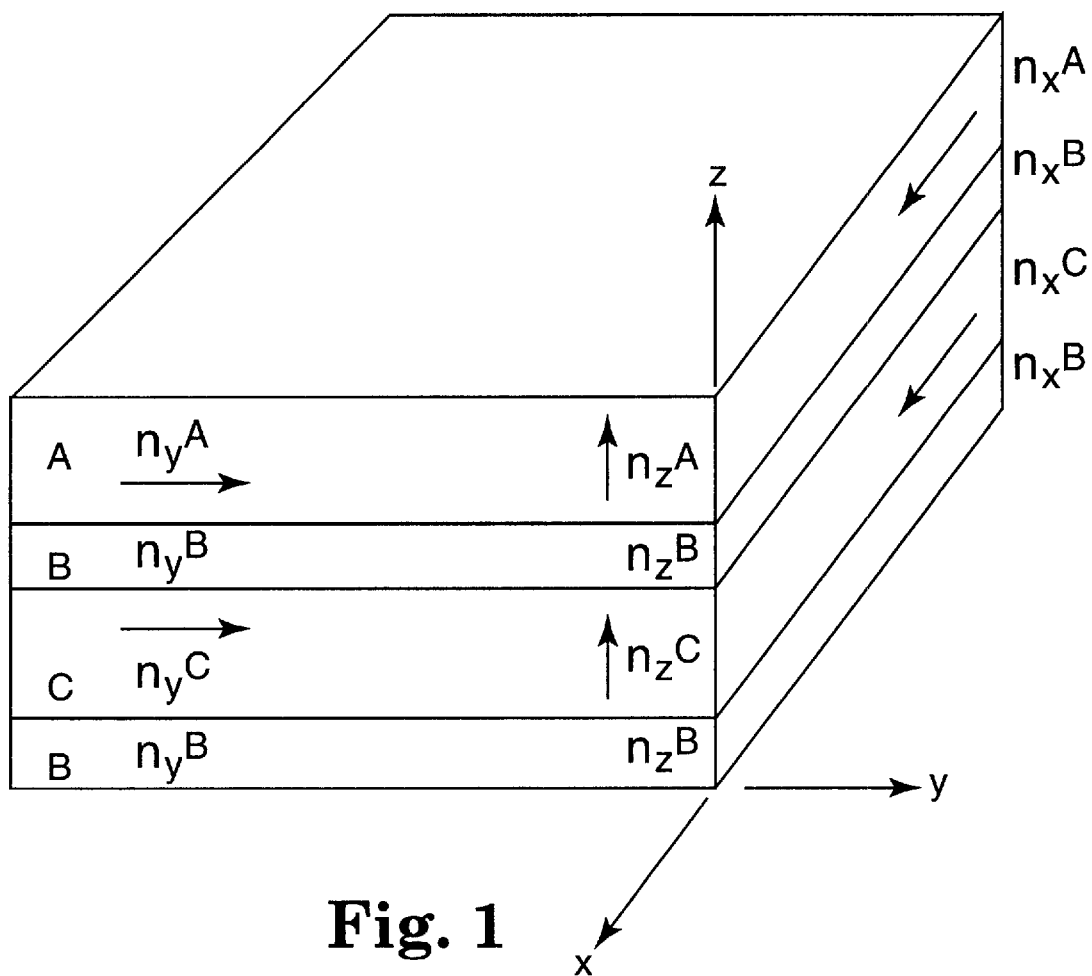
FIG. 1 is a schematic illustration of an optical repeating unit in accordance with the present invention.

The following definitions and conventions are used throughout the disclosure:

Multilayer film: a film comprising an optical repeating unit designed to reflect light over a particular range of wavelengths. The multilayer film may contain additional layers between the optical repeating units which may or may not be repeated throughout the multilayer film.

Optical repeating unit: a stack of layers arranged in a particular arrangement which is repeated across the thickness of a multilayer film.

In-plane axes: two mutually perpendicular axes disposed in the plane of the film. In the present application, these axes will typically be designated as the x-axis and the y-axis.

Transverse axis: an axis that is perpendicular to the plane of the film. In the present application, this axis will typically be designated as the z-axis.

The index of refraction for light polarized along a particular axis will typically be denoted as $n_i$, wherein i indicates the particular axis (i.e., $n_x$ denotes the index of refraction for light polarized along the x axis). The normalized index difference is the difference between refractive indices divided by the average of those indices. This accounts for dispersion (i.e., changes in refractive index with wavelength).

Negative birefringence: the situation in which the index of refraction along the transverse axis is less than the index of refraction along one or both in-plane axes ($n_z < n_x$ and/or $n_y$)

Positive birefringence: the situation in which the index of refraction along the transverse axis is greater than the index of refraction along one or both in-plane axes ($n_z > n_x$ and/or $n_y$)

Isotropic: the situation in which the indices of refraction along the x, y and z-axes are the same (i.e., $n_x = n_y = n_z$)

Infrared region: 700 nm to 2500 nm

Visible region: 400 nm to 700 nm

Optical thickness: the ratio defined as:

$$f^k = \frac{n^k * d^k}{\sum_{M=1}^{l} n^M d^M}$$

wherein $f^k$ is the optical thickness of polymeric layer k, 1 is the number of layers in the optical repeating unit, $n^k$ is the refractive index of polymeric layer k, and $d^k$ is the thickness of polymeric layer k. $N^M$ is the refractive index of the $M^{th}$ polymeric layer, and $d^M$ is the thickness of the $M^{th}$ polymeric layer. The optical thickness ratio of polymeric layer k along an optical axis j is denoted as $f_j^k$ and is defined as above but with replacement of $n^k$ with the refractive index of polymeric material k along axis j ($n_j^k$).

Skin layer: a layer that is provided as an outermost layer. Typically, skin layers in the films and optical bodies of the present invention will have a thickness between 10% and 20% of the sum of the physical thicknesses of all optical repeating units.

Monotonically varying thickness of an optical repeating unit along a multilayer film: the situation in which the thickness of the optical repeating unit either consistently decreases or consistently increases across the thickness of the film (e.g., the thickness of the optical repeating unit does not show an increasing trend along part of the thickness of the film and a decreasing trend along another part of the thickness of the film).

In accordance with one embodiment of this invention, a film or other optical body is provided which has an optical repeating unit comprising a multilayer stack containing m layers, where m is an integer of 4 or more. Such an optical repeating unit includes polymeric layers A, B and C, which are preferably arranged in an optical repeating unit having the layer sequence ABCB. The optical thickness ratio for each of the polymeric layers preferably have the values $f_x^a=\frac{1}{3}$, $f_x^b=\frac{1}{6}$ and $f_x^c=\frac{1}{3}$ and/or $f_y^a=\frac{1}{3}$, $f_y^b=\frac{1}{6}$ and $f_y^c=\frac{1}{3}$, wherein the second, thrid, and forth reflection harmonics are suppressed.

A schematic drawing of such a repeating unit is shown in FIG. 1. However, the values for the optical thickness ratios are not a necessary condition of this embodiment, as other optical thickness ratios can also result in suppression of some combination of second, third and forth-order reflection harmonics.

In the films and other optical bodies made in accordance with the present invention, it is preferred that at least one of the difference in indices of refraction between layers A and B along the z-axis ($n_z^a-n_z^b$) and the difference in indices of refraction between layers B and C along the z-axis ($n_z^b-n_z^c$) is negative. More preferably, at least one of these normalized differences is less than or equal to −0.03, and most preferably, at least one of these normalized differences is less than or equal to −0.06. In a particularly preferred embodiment of the present invention, the optical repeating unit is designed such that at least one of these normalized differences is less than 0 and preferably is less than or equal to −0.03, and such that the other difference is less than or equal to 0. Most preferably, both differences are less than 0. It has been found that such designs yield the most robust performance and exhibit an increase in the reflection of p-polarized light (and therefore, in total reflection) with increasing angle of incidence.

It is also possible to design a film or other optical body in accordance with the present invention which has an optical repeating unit in which both differences are substantially 0, i.e., wherein the absolute value of the normalized differences is preferably less than about 0.03. When both differences are substantially 0, there will be little or no decrease of the infrared reflection of p-polarized light with the angle of incidence.

According to a still further embodiment of the present invention, one of the differences in refractive index between layers A and B across the z-axis is of opposite sign to the difference in refractive index between layers B and C across the z-axis. In this embodiment, it is preferred that either the difference that is less than 0 has the largest absolute value or that the absolute value of both differences is substantially equal. Films and other optical bodies in accordance with this embodiment will have a substantially constant or increasing reflectance for p-polarized light with increasing angle of incidence, yielding a substantially increasing reflectance for unpolarized incident light with increasing incidence angle.

Figure 8:
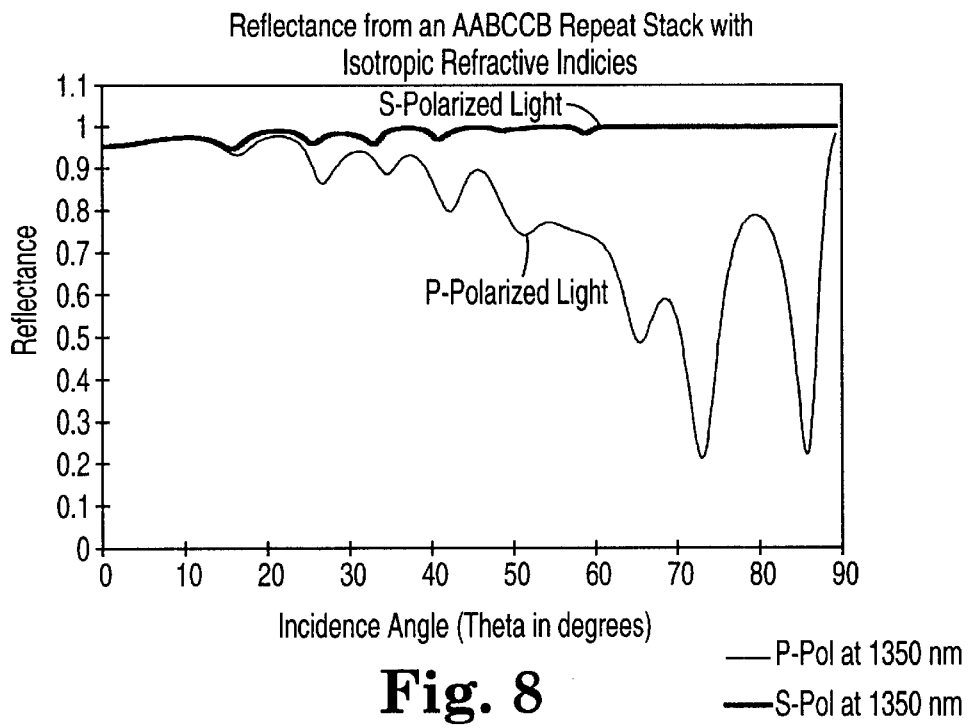
FIG. 8 is a graph of reflectance as a function of angle of incidence for the repeat unit of FIG. 1 when the indices of refraction are isotropic.

While the above described embodiments all yield optical repeating units which substantially suppress some combination of the second, third and fourth higher-order reflection harmonics, and for which there is either an increase of the p-polarized infrared reflection with an increase in angle of incidence of the light or a substantially constant p-polarized infrared reflection when the angle of incidence increases, it has been found that, when both differences are substantially larger than 0 or when one of them is substantially larger than 0 and the other is essentially 0, a substantial and unacceptable decrease of infrared reflection of p-polarized light is noticed as angle of incidence increases, leading to a decrease in reflectance for randomly polarized incident light. An example of this is illustrated in FIG. 8.

Figure 2:
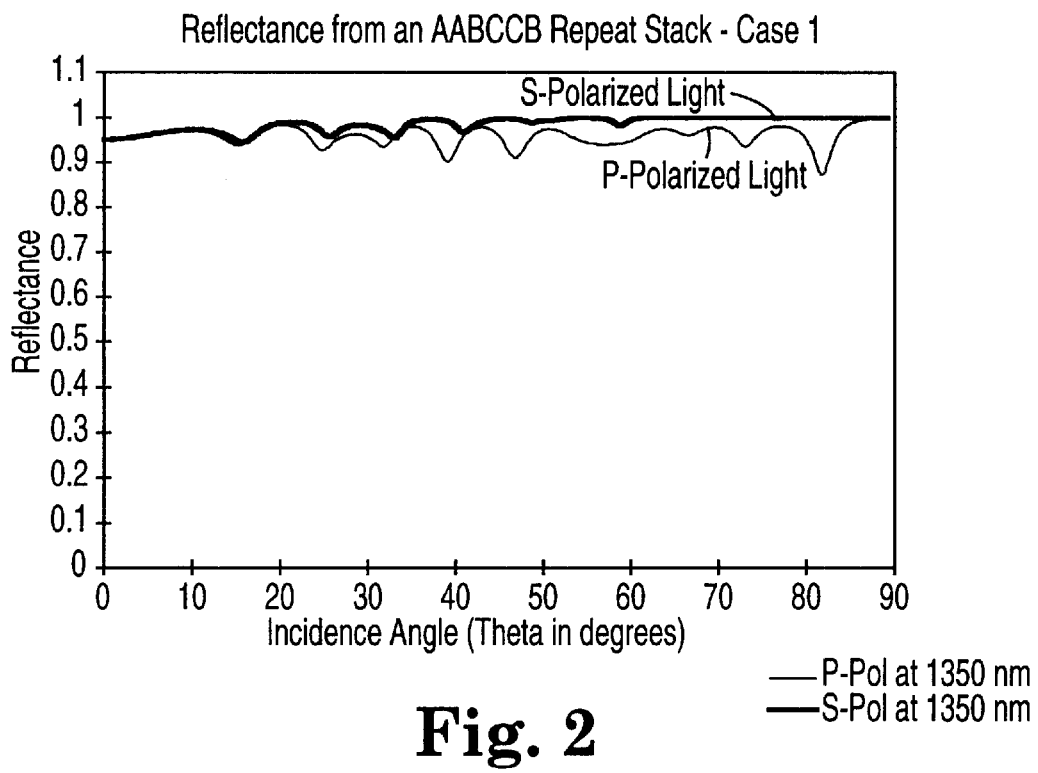
FIG. 2 is a graph of reflectance as a function of angle of incidence for the repeat unit of FIG. 1 when the indices of refraction arc related as specified in Case 1 of Table I.
Figure 3:
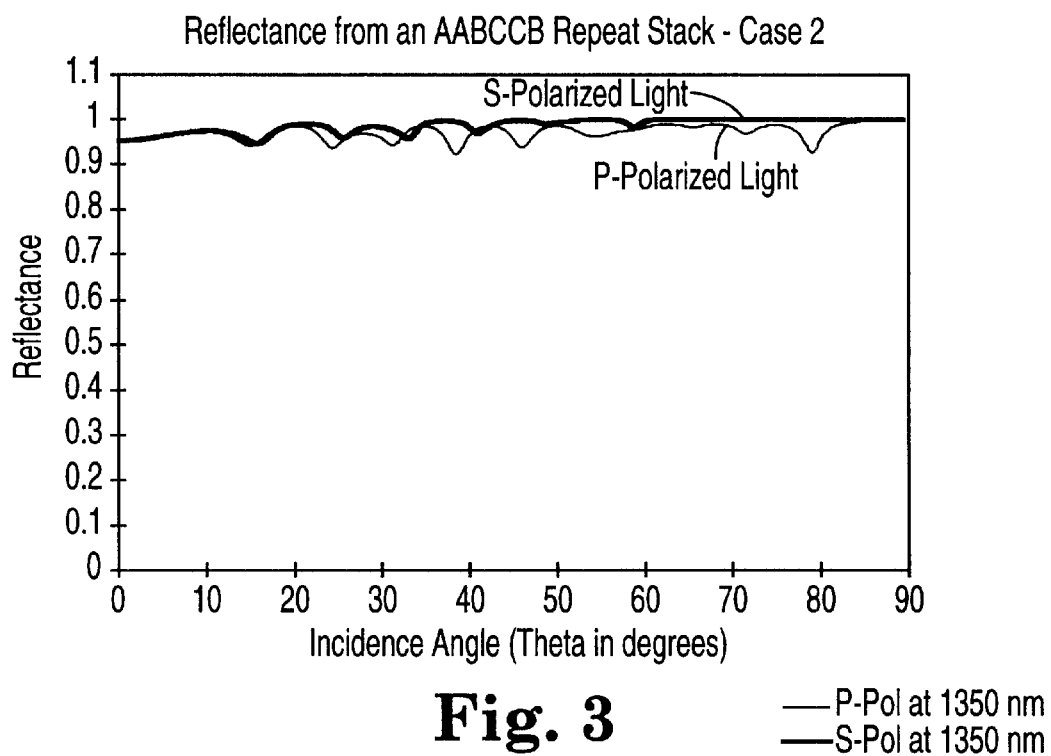
FIG. 3 is a graph of reflectance as a function of angle of incidence for the repeat unit of FIG. 1 when the indices of refraction are related as specified in Case 2 of Table I.

The behavior of the infrared reflection with angle of incidence is depicted for each of the above described embodiments for optical thickness ratios $f_x^a=\frac{1}{3}$, $f_x^b=\frac{1}{6}$ and $f_x^c=\frac{1}{3}$ and/or $f_y^a=\frac{1}{3}$, $f_y^b=\frac{1}{6}$ and $f_y^b=\frac{1}{3}$, in FIGS. 2–7. FIG. 2 shows the infrared reflection for p-polarized and s-polarized light with angle of incidence for an optical repeating unit wherein the difference $n_z^a-n_z^b$ is −0.14 and the difference $n_z^b-n_z^c$ is +0.13 and in which the optical repeating unit is otherwise designed such that the in-plane index relationships are in accordance with the present invention. In FIG. 3, the difference $n_z^a-n_z^b$ is +0.15, and the difference $n_z^b-n_z^c$ is −0.17. The behavior of both the p-polarized light and s-polarized light are shown since both components of light determine the total amount of light reflected for the typical instance of unpolarized incident light. However, the present invention allows for control (increasing reflectance with increasing angle of incidence) of the p-polarized component of the reflected light in a novel and unexpected way.

Figure 4:
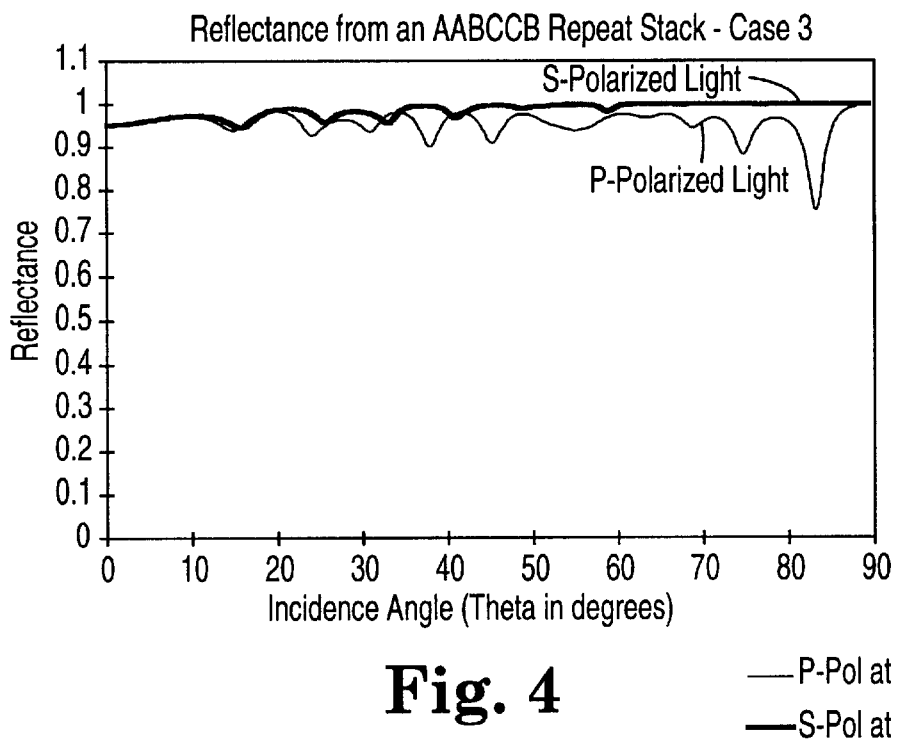
FIG. 4 is a graph of reflectance as a function of angle of incidence for the repeat unit of FIG. 1 when the indices of refraction are related as specified in Case 3 of Table I.

The present invention is further illustrated by reference to the comparative example shown in FIG. 8 with the examples of FIGS. 2 or 3. FIG. 8 illustrates how the reflectance changes with angle of incidence for repeat units in which the transverse index relationships among components A, B and C are not controlled in accordance with the present invention. FIG. 8 illustrates the typical variation of the amount of reflection of p-polarized and s-polarized light from the repeat stack, with the angle of incidence of light, where the difference $n_z^a-n_z^b$ is −0.15 and the difference $n_z^b-n_z^c$ is −0.13 . The materials A, B and C are each isotropic; their refractive indices are the same along all three axes. The overall reflectance for unpolarized incident light (the average of P and S-polarized reflectance) substantially decreases with increasing incidence angle. As seen from FIG. 8, there is a substantial decrease of the reflection of p-polarized light when the angle of incidence increases. In the example shown in FIG. 8, the components of the repeating unit A, B and C, are isotropic, meaning that the in-plane and transverse indices are equal. By contrast, a further embodiment in accordance with the present invention for which both differences are very small compared to the in plane index differences, exhibits substantially constant reflection of infrared p-polarized light as the angle of incidence is varied (FIG. 4). FIG. 4 shows a typical variation of the amount of reflection of p-polarized and s-polarized light from the repeat stack, where the difference $n_z^a-n_z^b$ is 0 and the difference $n_z^b-n_z^c$ is 0 (Table 1 Case 3).

Figure 5:
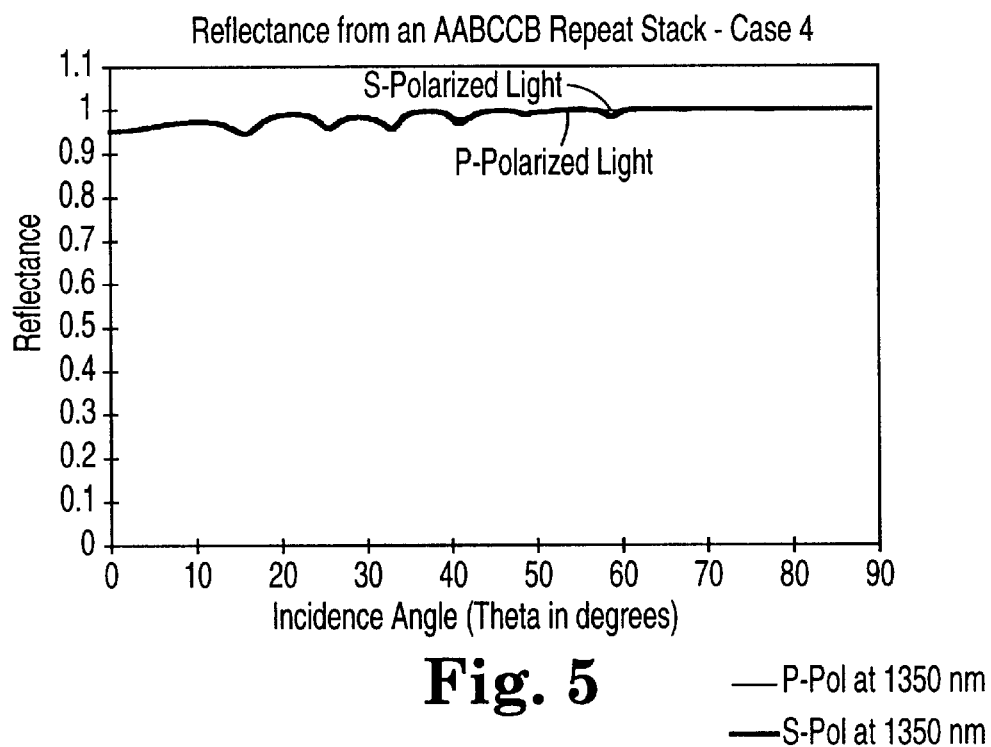
FIG. 5 is a graph of reflectance as a function of angle of incidence for the repeat unit of FIG. 1 when the indices of refraction are related as specified in Case 4 of Table I.
Figure 6:
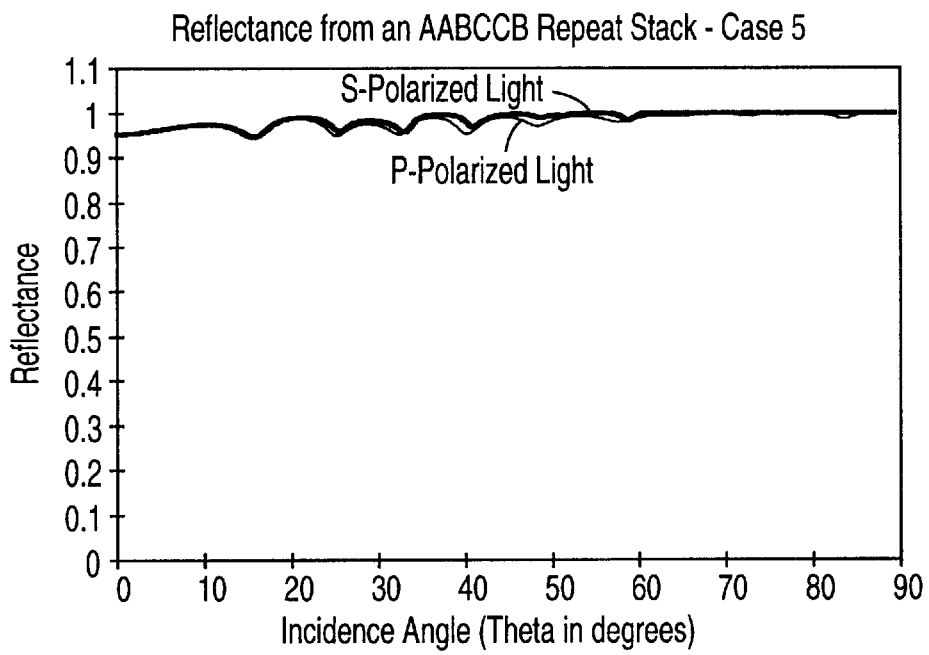
FIG. 6 is a graph of reflectance as a function of angle of incidence for the repeat unit of FIG. 1 when the indices of refraction are related as specified in Case 5 of Table I.
Figure 7:
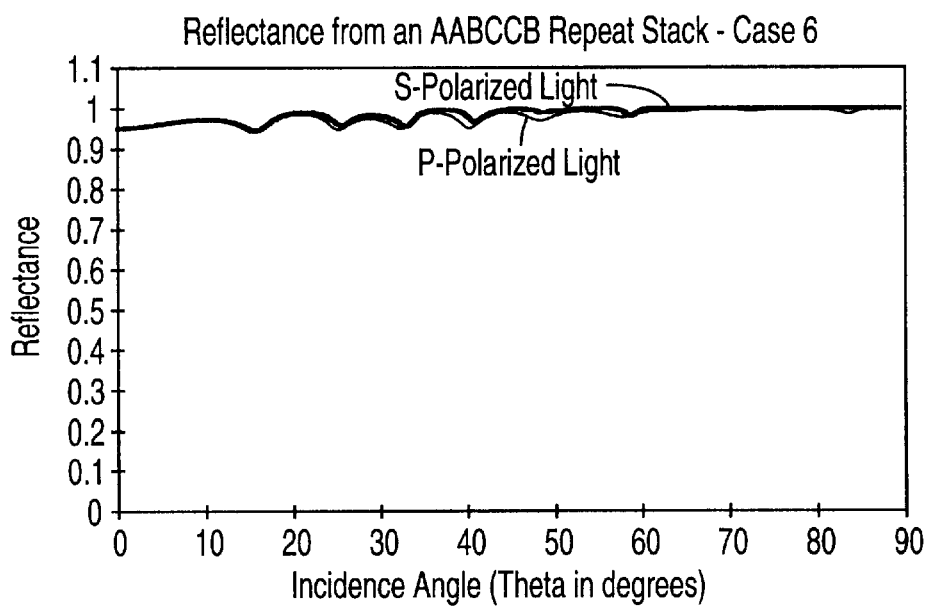
FIG. 7 is a graph of reflectance as a function of angle of incidence for the repeat unit of FIG. 1 when the indices of refraction are related as specified in Case 6 of Table I.

FIG. 5 shows an embodiment wherein $n_z^a-n_z^b$ is −0.13 and wherein the difference $n_z^b-n_z^c$ is −0.15 . (Table 1 Case 4). As can be seen from this figure, the infrared reflection for p-polarized light in this embodiment strongly increases with an increasing angle of incidence. Similarly, FIG. 6 shows the reflectance behavior for embodiments wherein $n_z^a-n_z^b$ is −0.13 and the difference $n_z^b-n_z^c$ is 0 (Table 1 Case 5), and FIG. 7 shows the reflectance behavior for embodiments wherein $n_z^a-n_z^b$ is 0 and the difference $n_z^b-n_z^c$ is −0.13. As can be seen from these figures, the infrared reflection of p-polarized light in the systems of FIGS. 6 and 7, as with the system of FIG. 5, increases with angle of incidence.

Figure 9:
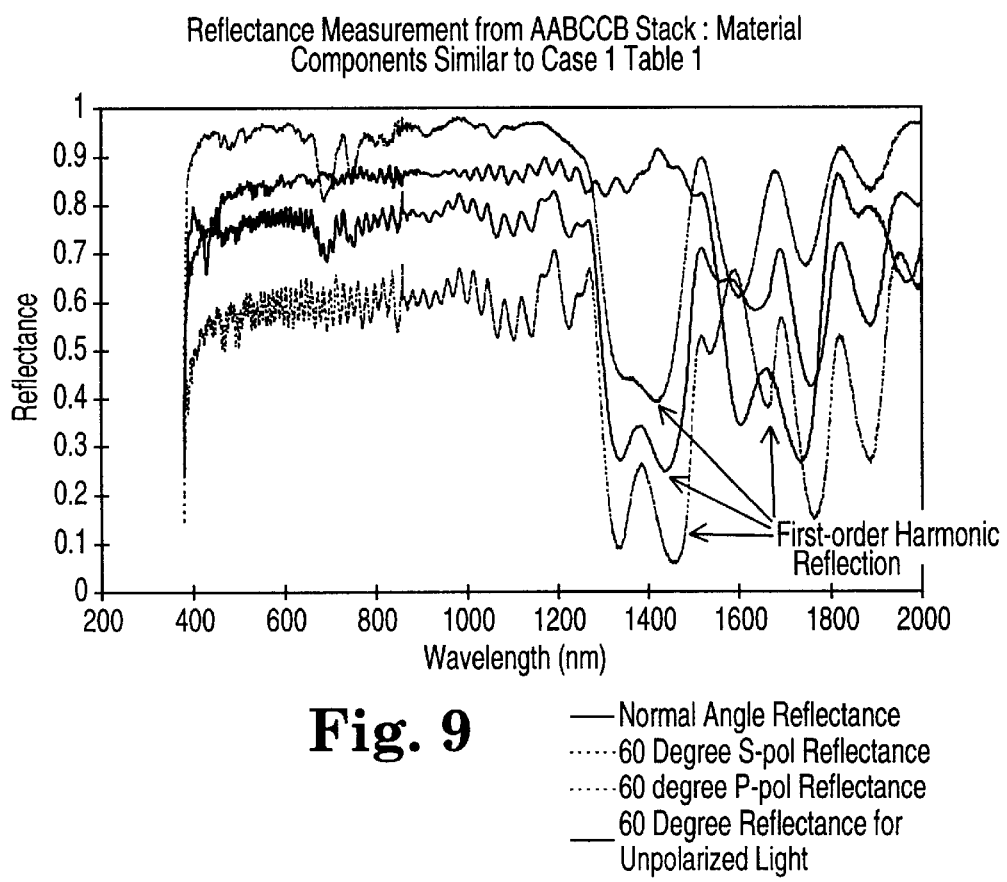
FIG. 9 is a graph of measured transmittance as a function of wavelength for a sample in which the repeat unit has the index of refraction relationship specified in Case 1 of Table I.

FIG. 9 illustrates the measured spectra of a film made in accordance with the present invention. The film stack uses a 4 layer repeat unit of the type ABCB wherein A is PEN, B is coPEN and C is PMMA. The stack is composed of a total of 15 repeat units. The overall reflectance of the average of S-polarized and P-polarized light, increases with incidence angle. The refractive indices for polymers A,B and C used in this example are substantially identified by those in Case 1 Table 1 shown below. In this example polymeric layers A, B and C have refractive index values such that $n_x^b=(n_x^a n_x^c)^{1/2}$ and/or $n_y^b=(n_y^a n_y^c)^{1/2}$ (square-root condition) while keeping the following in-plane optical thickness ratios: $f_x^a=1/3$, $f_x^b=1/6$ and $f_x^c=1/3$ and/or $f_y^a=1/3$ $f_y^b=1/6$ and $f_y^c=1/3$. The P-polarized reflectance at 60 degrees is substantially the same (with a change in wavelength location) as it is for normally incident light. As a result, the overall reflectance for unpolarized incident light (the average of P and S-polarized reflectance) substantially increases with increasing incidence angle.

In a further aspect of the present invention, the polymeric layers A, B and C have, along at least one in-plane axis, refractive indices which differ from each other. In particular, the refractive indices are such that the refractive index of polymeric layer B is intermediate to that of layers A and C along at least one in-plane axis. Furthermore, since polymeric layer A has the highest refractive index along at least one in-plane axis, the indices of refraction are in accordance with at least one of the relations specified in Formulas II and III:

$$n_x^a > n_x^b > n_x^c \quad \text{(Formula II)}$$

$$n_y^a > n_y^b > n_y^c \quad \text{(Formula III)}$$

In the case where only one of Formulas II and III are fulfilled (e.g., where $n^a > n^b > n^c$ along only one in-plane axis), the relationship along the other in-plane axis may be of any kind; preferably, however, the indices of refraction are substantially equal along this axis. Films and other optical bodies made in accordance with this embodiment will substantially reflect light polarized along the first in-plane axis and will substantially transmit light polarized along the other in-plane axis, leading to a reflective polarizer in the wavelength range encompassed by the first harmonic reflection.

In an especially preferred embodiment of the present invention, the optical repeat unit is designed such that the refractive index relationship in accordance with this invention is fulfilled along both in-plane axes, thereby yielding an optical repeating unit capable of reflecting light independent of its plane of polarization. IR mirrors made in accordance with this embodiment reflect infrared radiation but are substantially transparent to visible radiation, i.e., higher order reflections in the visible region of the spectrum are suppressed.

By adjusting the optical thickness ratios along the particular in-plane axis that has the index of refraction for polymeric layer B intermediate that of polymeric layer A and polymeric layer C, at least two higher order reflections for infrared light having its plane of polarization parallel to that particular in-plane axis can be suppressed. It is, however, preferred that the index of refraction for polymeric layer B be intermediate that of polymeric layers A and C along both in-plane axes and, by adjusting the optical thickness ratios along both in-plane axes, an infrared reflective mirror can be obtained for which at least two successive higher order reflections are suppressed. Such an infrared reflective mirror will be substantially transparent in the visible region and will be free of color (e.g., iridescence).

In another especially preferred embodiment of the present invention, the refractive indices for polymeric layers A, B and C are such that $n_x^b=(n_x^a n_x^c)^{1/2}$ and/or $n_y^b=(n_y^a n_y^c)^{1/2}$ (square-root condition), and layers A, B, and C have the following in-plane optical thickness ratios: $f_x^a=1/3$, $f_x^b=1/6$ and $f_x^c=1/3$ and/or $f_y^a=1/3$, $f_y^b=1/6$ and $f_y^c=1/3$. Such a configuration will consist of a repeat unit consisting of material A with optical thickness $f_x^a=1/3$, followed by material B with $f_x^b=1/6$, followed by material C with $f_x^c=1/3$, finally followed by material B again with $f_x^b=1/6$. Such a repeat cell is symbolically represented as ABCB. Embodiments of the present invention which have this repeat cell are capable of suppressing second, third and fourth order reflections for normally incident light. Accordingly, a reflective film designed according to this embodiment can be used to reflect infrared light up to about 2000 nm without introducing reflections in the visible region of the spectrum.

The particular refractive index relationships in accordance with the present invention can be obtained by appropriate selection of the polymeric materials used for each of the individual layers. The present invention typically requires that at least one of the polymeric layers A, B and C is a birefringent polymer. One or more of the other layers may be birefringent as well, or the other layers may be isotropic. Depending upon the particular polymer or polymer blend selected for a polymeric layer and on the processing conditions used to produce the optical repeating unit, a polymeric layer can be negatively birefringent, positively birefringent, or isotropic. The following table (Table I) shows embodiments that can yield optical repeating units in accordance with the present invention (in particular, the especially preferred embodiment described above, or other embodiments wherein $f_x^a=1/3$, $f_x^b=1/6$ and $f_x^c=1/3$ and/or $f_y^a=1/3$, $f_y^b=1/6$ and $f_y^c=1/3$, but for which the square-root condition is not satisfied) leading to increasing levels of reflectance with increasing angles of incidence.

The relationships among the refractive indices along the z-axis describe the invention for the more general case in which the in-plane index of refraction of polymer B is intermediate to that of polymers A and C, and the in-plane index of refraction of polymer A is greater than that of polymer C, with at least two successive higher-order harmonics being suppressed. It is to be understood that Table I shows general relationships among refractive indices for a given set of in-plane refractive indices, and that the amount of the difference in the index of refraction along the z-axis among the polymeric layers A, B and C in accordance with this invention will depend on the amount of birefringence of the birefringent layer(s).

TABLE I

Example Cases (ABCB Config.) in which Reflectivity Increases with Incidence Angle

| Case | Ny and/or Nx | Nz | Type | Sign ($N_y^a - N_y^b$) | Sign ($N_y^b - N_y^c$) | Sign($N_z^a - N_z^b$) | Sign($N_z^b - N_z^b$) |
|---|---|---|---|---|---|---|---|
| 1 | | | | | | $|N_z^a - N_z^b| \geq |N_z^b - N_z^c|$ | |
| A | 1.78 | 1.49 | B(+) | (+) | | (−) | |

TABLE I-continued

Example Cases (ABCB Config.) in which Reflectivity Increases with Incidence Angle

| Case | Ny and/or Nx | Nz | Type | Sign ($N_y^a - N_y^b$) | Sign ($N_y^b - N_y^c$) | Sign($N_z^a - N_z^b$) | Sign($N_z^b - N_z^c$) |
|---|---|---|---|---|---|---|---|
| B | 1.63 | 1.63 | I | | (+) | | (+) |
| C | 1.50 | 1.50 | I | | | | |
| 2 | | | | | | $\|N_z^a - N_z^b\| \leq \|N_z^b - N_z^c\|$ | |
| A | 1.78 | 1.78 | I | (+) | | (+) | |
| B | 1.63 | 1.63 | I | | (+) | | (−) |
| C | 1.50 | 1.80 | B(−) | | | | |
| 3 | | | | | | | |
| A | 1.78 | 1.50 | B(+) | (+) | | 0 | |
| B | 1.63 | 1.50 | B(+) | | (+) | | 0 |
| C | 1.50 | 1.50 | I | | | | |
| 4 | | | | | | | |
| A | 1.78 | 1.50 | B(+) | (+) | | (−) | |
| B | 1.63 | 1.63 | I | | (+) | | (−) |
| C | 1.50 | 1.78 | B(−) | | | | |
| 5 | | | | | | | |
| A | 1.78 | 1.50 | B(+) | (+) | | (−) | |
| B | 1.63 | 1.63 | I | | (+) | | 0 |
| C | 1.50 | 1.63 | B(−) | | | | |
| 6 | | | | | | | |
| A | 1.78 | 1.63 | B(+) | (+) | | 0 | |
| B | 1.63 | 1.63 | I | | (+) | | (−) |
| C | 1.50 | 1.76 | B(−) | | | | |

Note:
B(+) => negatively birefringent material
B(−) => positively birefringent material
I => Isotropic material The physical thickness of the individual polymeric layers A, B and C is generally selected so as to obtain a desired optical thickness ratio as explained above. Accordingly, the particular physical thickness of a layer is not a primary concern (of course, the physical thickness partly defines the optical thickness and the optical thickness of the optical repeat unit determines the wavelengths of the reflected light). However, the physical thickness of polymeric layers A, B and C is typically less than about 0.5 micrometers.

It is further preferred in the films and optical devices of the present invention that the normalized refractive indices between the polymers A, B and C are at least about 0.03 along an in-plane axis for which the refractive index relationship is in accordance with Formula II or Formula III. Thus, it is preferred that the normalized differences between $n_x^a$, $n_x^b$ and $n_x^c$ are at least about 0.03 and/or that the normalized differences between $n_y^a$, $n_y^b$ and $n_y^c$ differ from each other by at least about 0.03.

The especially preferred embodiment described above in which polymeric layers A, B and C have refractive indices such that $n_x^b = (n_x^a n_x^c)^{1/2}$ and/or $n_y^b = (n_y^a n_y^c)^{1/2}$, and having the in-plane optical thickness ratios $f_x^a = 1/3$, $f_x^b = 1/6$ and $f_x^c = 1/3$ and/or $f_y^a = 1/3$, $f_y^b = 1/6$ and $f_y^c = 1/3$, will suppress the second, third and forth reflection harmonics for normally incident light. When the incident light is non-normally incident, these higher-order reflection harmonics may become unsuppressed to a degree, depending on the polarization of the incident light, and the refractive index relationships among the in-plane and the z-axis of each polymeric material. Indeed, the degree to which higher-order harmonics, which are suppressed at normal incidence, provide reflectance at higher incidence angles can be substantial, leading to films which become colored or which are reflective to one polarization state at high incidence angles. Such optical properties can be controlled by specifying the index relationships described in Table I above. Each case will have increasing reflection of the first-order harmonic with increasing incidence angle, but will have differing amounts of increase in reflectance for the higher-order reflection harmonics (from zero at normal angle) with increasing angle of incidence. For example, Case 3 of Table I will result in negligible increase in reflectance with increasing angle (reflectance remains nearly zero), while Case 4 of Table I will exhibit a significant increase in reflectance for the higher-order harmonics with increasing angle of incidence.

Similarly, refractive index dispersion (changes in the in-plane axis and transverse axis refractive indices, with wavelength) can result in a degree of non-suppression of higher-order harmonics in certain wavelength region, even though the conditions for complete higher-order harmonic suppression are met in other wavelength regions. The degree to which refractive index dispersion can change the degree of higher-order harmonic suppression depends on the dispersion characteristic of the particular polymeric material comprising the repeat cell; certain polymers have greater dispersion than others. Such effects can be ameliorated by choices of polymers A, B and C, and by techniques such as designing the f-ratios to "best match" the required values for higher-order harmonic suppression across the wavelength range of interest. Indeed, both the effects of index dispersion and angle of incidence (described above) on causing a degree of non-suppression of higher-order harmonics can be minimized through polymer choice and "best-match" f-ratio design. The best match f-ratio design may include a variation in f-ratio distribution as a function of total repeat unit thickness. The distribution of repeat unit thickness may likewise be optimized.

Embodiments of the present invention for which the polymeric materials A, B and C have in-plane optical thickness ratios $f_x^a = 1/3$, $f_x^b = 1/6$ and $f_x^c = 1/3$ and/or $f_y^a = 1/3$, $f_y^b = 1/6$ and $f_y^c = 1/3$, but which do not satisfy the condition $n_x^b = (n_x^a n_x^c)^{1/2}$ and or $n_y^b = (n_y^{ac})^{1/2}$ (the square-root condition), will not have simultaneous suppression of the second, third and fourth-order reflection harmonics for normally incident light. When the in-plane refractive indices deviate from the square-root condition, some combination of the second, third and/or forth-order reflection harmonics will develop reflectance while the other(s) will remain suppressed. The details of this departure from suppression depend on the optical thickness ratios of the polymers A, B and C, and on the way in which the square-root condition is violated.

Other embodiments of the present invention which satisfy Formulas II and/or III, and which have a unit cell arrangement ABCB, can have in-plane refractive indices that do not satisfy the square root condition, and also do not have the in-plane optical thickness ratios $f_x^a=\frac{1}{3}$, $f_x^b=\frac{1}{6}$ and $f_x^c=\frac{1}{3}$ and/or $f_y^a=\frac{1}{3}$, $f_y^b=\frac{1}{6}$ and $f_y^c=\frac{1}{3}$. In such instances, various combinations of second, third and forth-order reflection harmonics can be suppressed, and control of the first-order reflection can be maintained as described above. Table II below shows several examples of this.

incident light, or in wavelength regions with high refractive index dispersion, will differ for each case illustrated in Table II.

Cases 3 through 6 in Table I, and Cases 7 through 10 in Table II, illustrate specific examples of a more general result: Any polymeric repeating unit arranged in a multilayer stack consisting of polymeric materials $P_1, P_2, P_3, \ldots P_m$, wherein the sign of the difference of in-plane refractive indices between adjacent polymers $P_i$ and $P_{i+1}$ is opposite the sign of the difference in the z-axis refractive indices between the same $P_i$ and $P_{i+1}$ for all polymeric interfaces, or wherein the sign of the difference in the z-axis refractive indices between the same $P_i$ and $P_{i+1}$ is equal to 0 for all polymer interfaces, will have increasing reflectance (of the first-order harmonic) of unpolarized incident light with increasing angle of incidence.

TABLE II

Example Cases (ABCB Config.) in which Reflectivity Increases with Incidence Angle

| Case | Ny and/or Nx | Nz | Type | Sign($N_y^a$ − $N_y^b$) | Sign($N_y^b$ − $N_y^c$) | Sign($N_z^a$ − $N_z^b$) | Sign($N_z^b$ − $N_z^c$) |
|---|---|---|---|---|---|---|---|
| 7 | | | | | | | |
| A | 1.78 | 1.50 | B(+) | (+) | | 0 | |
| B | 1.67 | 1.50 | B(+) | | (+) | | 0 |
| C | 1.50 | 1.50 | I | | | | |
| 8 | | | | | | | |
| A | 1.78 | 1.50 | B(+) | (+) | | (−) | |
| B | 1.67 | 1.67 | I | | (+) | | (−) |
| C | 1.50 | 1.78 | B(−) | | | | |
| 9 | | | | | | | |
| A | 1.78 | 1.50 | B(+) | (+) | | (−) | |
| B | 1.67 | 1.67 | I | | (+) | | 0 |
| C | 1.50 | 1.63 | B(−) | | | | |
| 10 | | | | | | | |
| A | 1.78 | 1.63 | B(+) | (+) | | 0 | |
| B | 1.67 | 1.67 | I | | (+) | | (−) |
| C | 1.50 | 1.76 | B(−) | | | | |

Note:
B(+) => negatively birefringent material
B(−) => positively birefringent material
I => Isotropic material The optical thickness ratios for polymeric materials A, B and C may have values that allow for suppression of differing combinations of the second, third and/or fourth-order reflection harmonics. Determining required values of refractive indicies and f-ratios for polymers A, B and C, for suppression of combinations of two or more higher-order harmonics, for isotropic materials at normal incidence, is explained in the art. Such values may be determined by analytic techniques when both the refractive index values and the f-ratios are considered unknowns (c.f. Much more R, B., J. Opt. Soc. Am., 38 20,(1948), and Thelen, A., J.Opt. .Soc. Am. 53, 1266 (1963) ), or through numerical techniques when the refractive index values are fixed by realistic polymer choices.

For example, for certain polymer refractive index values of $n_x^b=1.0255(n_x^a n_x^c)^{1/2}$ and/or $n_y^b=1.0255(n_y^a n_y^c)^{1/2}$ and $n_y^a=1.772$, $n_y^c=1.497$ and/or $n_x^a=1.772$ and $n_x^c=1.497$ if $f_x^a=0.200$, $f_x^b=0.200$ and $f_x^c=0.400$ and/or $f_y^a=0.200$, $f_y^b=0.200$ and $f_y^c=0.400$, then the second and third-order reflection harmonics will be suppressed. If, however, $f_x^a=(0.3846)$, $f_x^b=(0.1538)$ and $f_x^c=(0.3077)$ and/or $f_y^a=(0.3846)$, $f_y^b=(0.1538)$ and $f_y^c=(0.3077)$, then only the third and the forth-order reflection harmonics will be suppressed. As discussed above, higher-order harmonic suppression will occur for normally incident light, and suppression (or lack thereof) of the higher-order harmonics for non-normally In the films and other optical bodies produced in accordance with the present invention which are designed as IR reflectors, it is generally preferred that the polymeric layers of the optical repeating unit show substantially no absorption in the visible part of the spectrum unless some color tint is desired. An infrared reflective film produced in accordance with the present invention preferably reflects infrared light over a wide range of wavelengths, and accordingly an optical thickness variation is preferably introduced for the optical repeating unit along the thickness of the reflective film. In certain embodiments, sequences of optical repeat units with monotonically increasing and decreasing optical thickness are desired. Methods for designing optical thickness gradients for the optical repeat units are set forth in U.S. Pat. No. 6,157,490 entitled "Optical Film with Sharpened Bandedge", and incorporated herein by reference. The optical thickness of the optical repeating unit may monotonically increase or decrease along the infrared reflective film. Typically, an infrared reflective film in connection with the present invention can be designed to have an infrared reflective bandwidth of 200 nm to 1000 nm for a given optical repeat unit.

One skilled in the art will appreciate that a wide variety of materials can be used to form mirrors or polarizers according to the present invention when these materials are processed under conditions selected to yield the desired refractive index relationships. The desired refractive index relationships can be achieved in a variety of ways, including stretching during or after film formation (e.g., in the case of organic polymers), extrusion (e.g., in the case of liquid crystalline materials), or coating. It is preferred, however, that the two materials have similar rheological properties (e.g., melt viscosities) so that they can be co-extruded.

In general, appropriate combinations may be achieved by selecting for each of layers A, B and C, a crystalline, semi-crystalline, or liquid crystalline material, or an amorphous polymer. Of course, it is to be understood that, in the polymer art, it is generally recognized that polymers are typically not entirely crystalline, and therefore in the context of the present invention, crystalline or semi-crystalline-polymers refer to those polymers that are not amorphous and includes any of those materials commonly referred to as crystalline, partially crystalline, or semi-crystalline.

Specific examples of suitable materials include polyethylene naphthalate (PEN) and isomers thereof(e.g., 2,6-, 1,4-, 1,5-, 2,7-, and 2,3-PEN), polyalkylene terephthalates (e.g., polyethylene terephthalate (PET), polybutylene terephthalate (PBT), poly-1,4-cyclohexanedimethyleneterephthalate) and copolymers of these, e.g., PETG, polyimides (e.g., polyacrylic imides), polyetherimides, polycarbonates (including copolymers such as the copolycarbonate of 4,4'-thiodiphenol and bisphenol A in a 3:1 molar ratio, i.e., TDP), polymethacrylates(e.g., polyisobutyl methacrylate, polypropylmethacrylate,polyethylmethacrylate,and polymethylmethacrylate),polyacrylates(e.g., polybutylacrylate and polymethylacrylate),atactic polystyrene, syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene,fluorinated ethylene-propylene copolymers, polyvinylidene fluoride, and polychlorotrifluoroethylene),chlorinated polymers (e.g., polyvinylidenechloride and polyvinylchloride), polysulfones, polyethersulfones,polyacrylonitrile, polyamides, silicone resins, epoxy resins, polyvinylacetate, polyether-amides, ionomeric resins, elastomers (e.g.,. polybutadiene, polyisoprene, and neoprene), and polyurethanes. Also suitable are various copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of syndiotactic polystyrene (sPS) and atactic polystyrene).

A particularly preferred birefringent polymeric material for use in one or more layers of the films and other optical devices produced in accordance with the present invention is a crystalline or semi-crystalline polyethylenenaphthalate (PEN), inclusive of its isomers (e.g. 2,6-; 1,4-; 1,5-; 2,7; and 2,3-PEN). Particularly preferred isotropic polymeric materials for use in the present invention include polyacrylates and in particular, polymethylmethacrylate (PMMA). One skilled in the art will appreciate that each of the polymeric layers A, B and C may be composed of blends of two or more polymeric materials to obtain desired properties for a specific layer.

Preferred optical repeating units in connection with the present invention are optical repeating units that have polymeric layers A, B and C arranged in an order AABCCB. Especially preferred are those wherein layers A, B and C comprise the various sets of polymers as described in the following paragraphs.

The following material embodiments for the various optical cases are non-exclusive examples based on modeled data, since many such systems exist. For example, PBN (poly butylene naphthalate) or even a non-polyester can be used for the material of highest in-plane index. Index of refraction values are approximate and assume a wavelength of 632.8 nm. Copolymers of PEN with other polyesters are listed as coPENx/100-x, where x is the approximate percentage of NDC (naphthalene dicarboxylate) content and can vary by more than +/-20%. Unless otherwise noted, the coPENs are considered essentially unoriented by attention to the process conditions and by suitable selection of the components in the non-NDC fraction (100-x).

The example material systems listed in TABLE III below refer to the case examples illustrated in TABLE I and TABLE II and FIGS. 2-7. Some of the example material cases involve very similar polymers, but achieve different refractive index results through differing process conditions.

TABLE III

| Case No.* | Materials | Approx $N_y$ and $N_x$ | Approx $N_z$ |
|---|---|---|---|
| Case 1 | A = PEN | 1.74 | 1.48 |
|  | B = coPEN 60/40 | 1.61 | 1.61 |
|  | C = PMMA | 1.49 | 1.49 |
|  | - OR - |  |  |
|  | A = PEN | 1.74 | 1.48 |
|  | B = coPEN 70/30 | 1.62 | 1.62 |
|  | C = ECDEL ™ | 1.52 | 1.52 |
|  | (here ECDEL ™ is one of many aliphatic polyesters with this low value of isotropic index of refraction) |  |  |
|  | - OR - |  |  |
|  | A = PEN | 1.74 | 1.48 |
|  | B = TDP | 1.63 | 1.63 |
|  | C = ECDEL ™ | 1.52 | 1.52 |
|  | - OR - |  |  |
|  | A = PET | 1.65 | 1.49 |
|  | B = PC | 1.57 | 1.57 |
|  | C = PMMA | 1.49 | 1.49 |
|  | (Here PC can be a standard bis-phenol A type.) |  |  |
|  | - OR - |  |  |
|  | A = PET | 1.65 | 1.49 |
|  | B = PETG | 1.57 | 1.57 |
|  | C = PMMA | 1.49 | 1.49 |
| Case 7 | A = PEN | 1.74 | 1.48 |
|  | B = PET | 1.65 | 1.49 |
|  | C = PMMA | 1.49 | 1.49 |
| Case 3 | A = PEN | 1.74 | 1.48 |
|  | B = PBT | 1.63 | 1.47 |
|  | C = PMMA | 1.49 | 1.49 |
| Case 4 | A = PET | 1.65 | 1.49 |
|  | B = coPEN 50/50 | 1.60 | 1.60 |
|  | C = sPS | 1.55 | 1.63 |

TABLE III-continued

| Case No.* | Materials | Approx $N_y$ and $N_x$ | Approx $N_z$ |
|---|---|---|---|
| Case 5 | A = PEN | 1.74 | 1.50 |
| | B = coPEN | 1.63 | 1.63 |
| | C = sPS | 1.55 | 1.63 |

*(see TABLES I, II)

This invention also anticipates the formation of a multicomponent polarizing film for longer wavelengths (e.g., the near IR) which would also be substantially transparent in the visible region of the spectrum. In TABLES I and II, this is the case of one in-plane index set meeting the required conditions while the orthogonal set of in-plane indices are substantially matched across the IR spectrum of interest. Examples of such films may be constructed using the multiple drawing step processes in U.S. Ser. No. 09/006,455. One particular combination for materials A and C may include PEN and a copolymer comprising 10% of PEN type subunits and 90% of PET type subunits, i.e., an orienting and crystallizable 10/90 co-PEN (as is obtained from a coextruded transesterified blend of 10 weight % PEN and 90 weight % PET). The choice of material B could be an intermediate copolymer of these, e.g., an orienting and crystallizable 70/30 co-PEN. In general, a variety of IR polarizers could be constructed by a variety of material combinations with this method.

The films and other optical devices made in accordance with the invention may also include one or more antireflective layers or coatings, such as, for example, conventional vacuum coated dielectric metal oxide or metal/metal oxide optical films, silica sol gel coatings, and coated or coextruded antireflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the films and optical devices of the present invention through appropriate surface treatment, such as coating or sputter etching.

Both visible and near IR dyes and pigments are contemplated for use in the films and other optical bodies of the present invention, and include, for example, optical brighteners such as dyes that absorb in the UV and fluoresce in the visible region of the color spectrum. Other additional layers that may be added to alter the appearance of the optical film include, for example, opacifying (black) layers, diffusing layers, holographic images or holographic diffusers, and metal layers. Each of these may be applied directly to one or both surfaces of the optical film, or may be a component of a second film or foil construction that is laminated to the optical film. Alternately, some components such as opacifying or diffusing agents, or colored pigments, may be included in an adhesive layer which is used to laminate the optical film to another surface.

Suitable methods for making reflective multilayer films of the type toward which the present invention is directed are described, for example, in U.S. Ser. No. 09/006,288 which is hereby incorporated by reference. However, some of the considerations involved in these methods are discussed briefly below.

It is preferred that the polymers have compatible rheologies to facilitate coextrusion. That is, since the use of coextrusion techniques is preferred in making the films and other optical bodies of the present invention, the melt viscosities of the polymers are preferably reasonably matched to prevent layer instability or non-uniformity. The polymers used also preferably have sufficient interfacial adhesion so that the resulting films will not delaminate.

The multilayer reflective films of the present invention can be readily manufactured in a cost effective way, and can be formed and shaped into a variety of useful configurations after coextrusion. Multilayer infrared reflective films in accordance with the present invention are most advantageously prepared by employing multilayered coextrusion devices such as those described in U.S. Pat. Nos. 3,773,882 and 3,884,606, the disclosures of which are incorporated herein by reference. Such devices provide a method for preparing multilayered, simultaneously extruded thermoplastic materials, each of which are of a substantially uniform layer thickness. Preferably, a series of layer multiplying means as are described in U.S. Pat. No. 3,759,647, the disclosure of which is incorporated herein by reference, are employed.

The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final body. Optionally, this multilayered stream may be subsequently passed through a series of layer multiplying means in order to further increase the number of layers in the final body.

The multilayered stream is then passed into an extrusion die which is so constructed and arranged that stream-lined flow is maintained therein. Such extrusion devices are described in U.S. Pat. No. 3,557,265, the disclosure of which is incorporated by reference. The resultant product is extruded to form a multilayered body in which each layer is generally parallel to the major surface of adjacent layers.

The configuration of the extrusion die may vary and can be such as to reduce the thickness and dimensions of each of the layers. The precise degree of reduction in thickness of the layers delivered from the mechanical orienting section, the configuration of the die, and the amount of mechanical working of the body after extrusion are all factors which affect the thickness of the individual layers in the final body.

The number of layers in the reflective films and other optical devices made in accordance with the present invention can be selected to achieve the desired optical properties using the minimum number of layers for reasons of film thickness, flexibility and economy. In the case of both infrared reflective polarizers and infrared reflective mirrors, the number of layers is preferably less than about 10,000, more preferably less than about 5,000, and most preferably, less than about 2,000.

The desired relationship between refractive indices of polymeric layers A, B and C as desired in this invention can be achieved by selection of appropriate processing conditions. In the case of organic polymers which can be oriented by stretching, the multilayer films are generally prepared by co-extruding the individual polymers to form a multilayer film (e.g., as set out above) and then orienting the film by stretching at a selected temperature, optionally followed by heat-setting at a selected temperature. Alternatively, the extrusion and orientation steps may be performed simultaneously. By the orientation, the desired extent of birefringence (negative or positive) is set in those polymeric layers that comprise a polymer that can exhibit a birefringence. Positive birefringence is obtained with polymers that show a negative optical stress coefficient, i.e., polymers for which the in-plane indices will decrease with orientation whereas negative birefringence is obtained with polymers having a positive optical stress coefficient.

In the case of polarizers, the film is typically stretched substantially in one direction (uniaxial orientation), while in the case of mirrors, the film can be stretched substantially in two directions (biaxial orientation). However, with the proper selection of conditions, polarizing films can be made through biaxial orientation. Such films may be made, for example, by stretching the film under such conditions that particular layers are selectively oriented and other layers are not. Suitable methods for producing biaxial polarizers in accordance with the present invention are described, for example, in U.S. Ser. No. 09/006,455.

In the case of mirrors, the stretching may be asymmetric to introduce specially desired features, but is preferably symmetric. Reflective mirrors may also be obtained in accordance with the present invention by laminating together two infrared reflective films that have each been uniaxially oriented in such a way that their axes of orientation are rotated 90° to one another.

The film may be allowed to dimensionally relax in the cross-stretch direction from the natural reduction in cross-stretch (equal to the square root of the stretch ratio), or may be constrained so that there is no substantial change in cross-stretch dimensions. The film may be stretched in the machine direction, as with a length orienter, and/or in the transverse or width direction using a tenter.

The pre-stretch temperature, stretch temperature, stretch rate, stretch ratio, heat set temperature, heat set time, heat set relaxation, and cross-stretch relaxation are selected to yield a multilayer device having the desired refractive index relationship. These variables are inter-dependent; thus, for example, a relatively low stretch rate could be used if coupled, for example, with a relatively low stretch temperature. One skilled in the art will appreciate that various combinations of these variables may be selected to achieve a desired multilayer device. In general, however, a stretch ratio in the range from about 1:2 to about 1:10 (more preferably about 1:3 to about 1:7) in the stretch direction and from about 1:0.2 to about 1:10 (more preferably from about 1:0.2 to about 1:7) orthogonal to the stretch direction is preferred.

Suitable multilayer films may also be prepared using techniques such as spin coating (e.g., as described in Boese et al., J. Polym. Sci.: Part B, 30:1321 (1992) for birefringent polyimides), and vacuum deposition (e.g., as described by Zang et. al., Appl. Phys. Letters, 59:823 (1991) for crystalline organic compounds). The latter technique is particularly useful for certain combinations of crystalline organic compounds and inorganic materials.

Orientation of the extruded film can be accomplished by stretching individual sheets of the material in heated air. For economical production, stretching may be accomplished on a continuous basis in a standard length orienter, tenter oven, or both. Economies of scale and line speeds of standard polymer film production may be achieved, thereby reducing manufacturing costs below levels associated with commercially available absorptive polarizers.

Lamination of two or more reflective films together is advantageous to improve reflectivity or to broaden the bandwidth, or to form a mirror from two polarizers as described above. Amorphous copolyesters, such VITEL™ 3000 and 3300 which are commercially available from the Goodyear Tire and Rubber Co. of Akron, Ohio, are useful as laminating materials. The choice of laminating material is broad, with degree of adhesion, optical clarity and exclusion of air being the primary guiding principles.

It may be desirable to add to one or more of the layers one or more inorganic or organic adjuvants such as an antioxidant, extrusion aid, heat stabilizer, ultraviolet ray absorber, nucleator, surface projection forming agent, and the like in normal quantities so long as the addition does not substantially interfere with the performance of the present invention.

A practical situation that can arise in the selection of a glue or "tie" layer is that it is common for elastomers, polyolefins, and other polymers which are good candidate tie layer materials to be isotropic and have the lowest refractive index of any of the repeat cell components (often they are in the 1.47–1.52 range). Issues of material cost, optical haze, absorptive color, or overall mechanical properties may preclude using the thickness of the tie layer required for a two component system consisting of the low index tie layer with a high index material in a 2 component repeat cell. A solution to this problem is to design the 3 component repeat cell in a pattern A/C/B/C where $n^a > n^b > n^c$ in at least one in-plane direction and wherein C is the aforementioned tie layer having the lowest index (it is also possible that Nb=Nc). For the aforementioned reasons it may be desirable to make the thickness of the C layer as small as possible to minimize the cost and optical haze/absorptive color problems.

If a film of the present invention is designed to reflect light in the infrared region, it may be preferable to further design the film to avoid a change in perceived color as the viewing angle or angle of incidence of light changes, for example, from normal incidence to non-normal incidence, while maintaining the ability to provide infrared blocking properties over as much of the infrared region of the spectrum as possible. For typical dielectric multilayer films, if the reflecting band is positioned to reflect the maximum amount of solar radiation at normal angles of incidence while remaining clear in the visible region of the spectrum, the short wavelength bandedge is positioned at or near the visible wavelength cutoff, i.e. at about 700 nm. The reflecting band moves to shorter wavelengths at non-normal angles of incidence, however, so that while the film appears clear at normal angles, it will be colored at non-normal angles.

For some applications, it is desirable that the film appear clear at all angles of light incidence or viewing angles, and to accomplish this, the reflecting band must be positioned at longer wavelengths within the infrared so that the short wavelength bandedge does not shift into the visible region of the spectrum even at maximum use angles. This can be accomplished by designing an infrared reflecting film of the present invention so that the film has a reflecting band positioned to reflect infrared radiation of at least one polarization at an incident angle normal to the film, where the reflecting band has a short wavelength bandedge $\lambda_{a0}$ and long wavelength bandedge $\lambda_{b0}$ at a normal incident angle, and a short wavelength bandedge $\lambda_{a\theta}$ and long wavelength bandedge $\lambda_{b\theta}$ at a maximum usage angle θ, wherein $\lambda_{a\theta}$ is less than $\lambda_{a0}$ and $\lambda_{a0}$ is selectively positioned at a wavelength greater than about 700 nm. At least one component can then be provided as part of the film or in addition to the film which at least partially absorbs or reflects radiation in the wavelength region between $\lambda_{a\theta}$ and $\lambda_{a0}$ at a normal angle of incidence.

The component functions to either absorb or reflect the infrared wavelengths that are not reflected by the film at normal angles because of the positioning of the reflective band of the multilayer film at higher wavelengths in order to minimize perceived color changes at non-normal incidence. Depending on the placement of the gap filler component relative to the film, the component may not function at non-normal angles because the reflective band gap due to the reflection of the multilayer film shifts to lower wavelengths, preferably coinciding with the wavelength region of the absorption or reflection of the gap filler component. Placement of the reflective band within the infrared and components useful for filling the resulting band gap that occurs at normal angles are more fully described in U.S. Pat. No. 6,049,419, incorporated herein by reference.

Suitable gap filler components include an infrared absorbing dye or pigment, an infrared absorbing glass, a trailing segment, a plurality of isotropic layers, or combinations thereof. The gap filler component may be a part of the film, for example, as a trailing segment or a plurality of isotropic layers coextruded with the film layers or as a dye or pigment incorporated into one or more of the film layers.

Alternatively, the gap filler component may be a discrete part of the optical body of the present invention, i.e., separate from the film, that is attached, for example, laminated thereto. Examples of this embodiment include a dye or pigment as a separate layer adhered to the film. The description of the gap filler as a part of the film and separate from the film is merely exemplary. The gap filler component disclosed herein may be either be a part of the film or may be separate from the film depending on the characteristics of the component itself and the film with which it is being combined.

The film and the gap filler components are preferably combined such that the film is placed on a surface nearest the sun as practical because it is more efficient to reflect solar energy than to absorb it. In other words, where possible, it is preferable that the sun's rays first encounter the film and then secondarily encounter the gap filler component. In a multiple pane or two-ply windshield, the most preferable placement for the film is the exterior nearest the sun, the next preferably position is between the panes or plies. The film may be placed on the interior surface but this allows absorption of solar light by the glass before the light reaches the film and absorption of part of the light reflected from the film. This embodiment may be preferable when considered from a UV protection standpoint, since it may be preferable to position the film away from the sun, allowing components which are less sensitive to UV to absorb this part of the light.

Examples of suitable infrared absorbing dyes include cyanine dyes as described, for example, in U.S. Pat. No. 4,973,572, hereby incorporated by reference, as well as bridged cyanine dyes and trinuclear cyanine dyes as described, for example, in U.S. Pat. No. 5,034,303, hereby incorporated by reference, merocyanine dyes as described, for example, in U.S. Pat. No. 4,950,640, hereby incorporated by reference, carbocyanine dyes (for example, 3,3'-diethyloxatricarbocyanine iodide, 1,1', 3,3,3', 3'-hexamethylindotricarbocyanine perchlorate, 1,1',3,3,3',3'-hexamethylindotricarbocyanine iodide, 3,3'-diethylthiatricarbocyanine iodide, 3,3'-diethylthiatricarbocyanine perchlorate, 1,1',3,3,3', 3'-hexamethyl-4,4', 5,5'-dibenzo-2,2'-indotricarbocyanine perchlorate, all of which are commercially available from Kodak, Rochester, N.Y.), and phthalocyanine dyes as described, for example, in U.S. Pat. No. 4,788,128, hereby incorporated by reference; naphthaline dyes; metal complex dyes, for example, metal dithiolate dyes (for example, nickel dithiolate dyes and, for example, bis[4-dimethylaminodithiobenzil] nickel, bis[dithiobenzil] nickel, bis[1,2-bis(n-butylthio)ethene-1,2-dithiol]nickel bis [4,4'-dimethoxydithiobenzil] nickel, bis[dithiobenzil] platinum, bis[dithioacetyl] nickel) and metal dithiolene dyes (for example, nickeldithiolene dyes as described, for example, in U.S. Pat. No. 5,036,040, hereby incorporated by reference); polymethine dyes such as bis(chalcogenopyrylo) polymethine dyes as described, for example, in U.S. Pat. No. 4,948,777, hereby incorporated by reference, bis(aminoaryl) polymethine dyes as described, for example, in U.S. Pat. No. 4,950,639, hereby incorporated by reference, indene-bridged polymethine dyes as described, for example, in U.S. Pat. No. 5,019,480, hereby incorporated by reference, and tetraaryl polymethine dyes; diphenylmethane dyes; triphenylmethane dyes; quinone dyes; azo dyes; ferrous complexes as described, for example, in U.S. Pat. No. 4,912,083, hereby incorporated by reference; squarylium dyes as described, for example, in U.S. Pat. No. 4,942,141, hereby incorporated by reference; chalcogenopyryloarylidene dyes as described, for example, in U.S. Pat. No. 4,948,776, hereby incorporated by reference; oxoindolizine dyes as described, for example, in U.S. Pat. No. 4,948,778, hereby incorporated by reference; anthraquinone and naphthoquinone derived dyes as described, for example, in U.S. Pat. No. 4,952,552, hereby incorporated by reference; pyrrocoline dyes as described, for example, in U.S. Pat. No. 5,196,393, hereby incorporated by reference; oxonol dyes as described, for example, in U.S. Pat. No. 5,035,977, hereby incorporated by reference; squaraine dyes such as chromylium squaraine dyes, thiopyrylium squaraine dyes as described, for example, in U.S. Pat. No. 5,019,549, hereby incorporated by reference, and thiochromylium squaraine dyes; polyisothianaphthene dyes; indoaniline and azomethine dyes as described, for example, in U.S. Pat. No. 5,193,737, hereby incorporated by reference; indoaniline methide dyes; tetraarylaminium radical cation dyes and metallized quinoline indoaniline dyes. Squarylium dyes or squaraines are also described, for example, in U.S. Pat. No. 4,942,141 and U.S. Pat. No. 5,019,549, both of which are hereby incorporated by reference.

Commercially available phthalocyanine dyes include, for example, those available from Zeneca Corporation, Blackley, Manchester, England under the trade designation "Projet Series" for example, "Projet 830NP", "Projet 860 NP" and "Projet 900NP".

Commercially available metal complex dyes include those available from C. C. Scientific Products, Ft. Worth, Tex. 76120, for example, bis[4-dimethylaminodithiobenzil] nickel.

Additional suitable dyes include those described in Jurgen Fabian's article entitled "Near Infrared Absorbing Dyes" Chem Rev, 1992, 1197–1226 and "The Sigma Aldrich Handbook of Stains, Dyes and Indicators" by Floyd J. Green, Aldrich Chemical Company, Inc., Milwaukee, Wis. ISBN 0-941633-22-5,1991, both of which are hereby incorporated by reference. Useful near infrared absorbing dyes include those from Epolin, Inc., Newark, N.J., for example, having the trade designations: Epolight III-57, Epolight III-117, Epolight V-79, Epolight V-138, Epolight V-129, Epolight V-99, Epolight V-130, Epolight V-149, Epolight IV-66, Epolight IV-62A, and Epolight III-189.

Suitable infrared absorbing pigments include cyanines, metal oxides and squaraines. Suitable pigments include those described in U.S. Pat. No. 5,215,838, incorporated herein by reference, such as metal phthalocyanines, for example, vanadyl phthalocyanine, chloroindium phthalocyanine, titanyl phthalocyanine, chloroaluminum phthalocyanine, copper phthalocyanine, magnesium phthalocyanine, and the like; squaraines, such as hydroxy squaraine, and the like; as well as mixtures thereof. Exemplary copper pthalocyanine pigments include the pigment commercially available from BASF under the trade designation "6912". Other exemplary infrared pigments include the metal oxide pigment commercially available from Heubach Langelsheim under the trade designation "Heucodor".

Dyes or pigments useful in the present invention may be narrow-band absorbing, absorbing in the region of the spectrum not covered because of the position of the short wavelength bandedge of the optical body, for example, 700 to 850 nm, or may be broad band, absorbing over substantially all or all of the infrared region.

The dye or pigment can be applied to either surface of the film, in a layer of glass or polymer, such as polycarbonate or acrylic, laminated to the film, or be present in at least one of the polymer layers of the film. From a solar energy standpoint, the dye is preferably on the innermost surface of the film (i.e. toward the room interior and away from the sun) so that when the sun is a high angle, the film reflective band shifts to lower wavelengths, essentially coinciding with the wavelength region of the dye. This is preferred because reflecting solar energy away from the building is preferred to absorbing it.

The amount of dye or pigment used in the optical body of the present invention varies depending on the type of dye or pigment and/or the end use application. Typically, when applied to the surface of the film, the dye or pigment is present on the surface at a concentration and coating thickness suitable to accomplish the desired infrared absorption and visible appearance. Typically, if the dye or pigment is within an additional layer or within the multilayer optical body, the concentration ranges from about 0.05 to about 0.5 weight %, based on the total weight of the optical body. In addition, when a pigment is used, a small particle size typically is needed, for example, less than the wavelength of light. If the dyes are non-polar solvent soluble, the dyes can be coated or mixed in with solid plastic pellets and extruded if the dyes can withstand the heat of mixing and extrusion.

Examples of suitable infrared absorbing glasses include clear glass having a thickness generally ranging from about 3 to about 6 mm, such as architectural or automotive glass; blue glass; or green glass which selectively absorb in the near infrared, i.e., about 700 to 1800 nm.

In the embodiments where blue or green glass is used, it is preferable that the film of the present invention is located on the surface of the glass closest to the sun so that the film can reflect away the 850–1250 nm wavelengths, allowing some of the infrared which is not reflected to be absorbed by the glass. If it is not practical to place the film on the exterior surface of a glass layer, for example, on the exterior of a window of a building, it may be useful to place the film between panes of glass, rather than on the surface closest to the interior, in the case of multiple pane windows, in order to minimize absorption. Preferably, the exterior layer (closest to the sun) has minimal infrared absorbing properties so that the film is able to reflect light in the infrared region before this light reaches the interior infrared absorbing glass. In this embodiment, the glass temperature would be lower and less heat would enter the room due to re-radiation of absorbed light. Additionally, the glass and/or film would be cooler which would reduce cracking of the glass due to thermal stress, a common problem with heavily absorbing materials.

Infrared absorbing glass is available commercially from companies including Pittsburgh Plate Glass (PPG), Guardian, Pilkington-Libbey Owens Ford, Toledo, Ohio.

Generally a sharp band edge is desired in optical interference films such as the infrared reflective films described herein. Sharp band edges can be obtained from proper design of the layer thickness gradient throughout the multilayer optical stack, as described in U.S. Pat. No. 6,157,490. Instead, a reflective film of the present invention can be designed to include a trailing segment to partially reflect infrared wavelengths in the gap region without producing strong color in the visible spectrum at non-normal angles. A trailing segment can be provided as a multilayer interference film have layer thicknesses and refractive indices such that the reflectance in the gap region is relatively weak, for example, 50% and which may decrease so that transfer from high reflectance to low reflectance of the multilayer film is gradual. For example, a layer gradient may provide a sharp bandedge above, for example, the 50% reflectance point and a trailing segment could be provided by additional layers. For example, instead of providing a sharp edge, the last 30 layers of a 200 layer stack could be of appropriate optical thickness that their first order reflection occurs in the range of about 800–850 nm, the intensity of which increase from about 90% reflection at 850 nm to about 25% at 800 nm. The other 170 layers could provide, for example, about 90% reflection from about 850–1150 nm. Achieving the trailing segment can be done in a number of ways, for example, by controlling the volumetric feed of the individual layers. The trailing segment may be extruded with the multilayer film of the present invention or laminated thereto.

Possible advantages of a trailing segment is that instead of an abrupt transition from no color to maximum color, the trailing segment provides a "softer" transition which may be more aesthetically acceptable and easier to control from a process standpoint.

An isotropic multilayer film may also be used to cover at least a portion of the wavelength gap. Isotropic layers lose p-pol reflection intensity at oblique angles. Accordingly, at oblique angles, the z-index matched reflectance band would shift into the gap and the reflectance from the isotropic layers would shift to the visible but also decrease in p-pol intensity. S-pol would be masked or partially masked by the air/optical body surface which would increase its reflectance at oblique angles. Exemplary isotropic polymers include but are not limited to isotropic coPEN, PMMA, polycarbonates, styrene acrylonitriles, PETG, PCTG, styrenics, polyurethanes,polyolefins, and fluoropolymers. The isotropic film may be coextruded with a film of the present invention or laminated to a film of the present invention.

Preferably, gap filler component is situated such that light hits the film of the present invention before it hits the gap filler component so that, then when the sun is at normal incidence, the gap filler absorbs light in the region of the gap. However, when the sun is at high angles, the film will shift to some of the same wavelengths as the gap filler component and serve to reflect at least some of the light in the region of the gap.

Gap filler components may be used in combination with the film of the present invention, for example, when each gap filler component only absorbs or reflects in a portion of the gap to be filled. In addition, shifting the bandedge and, thus, creating the gap, also serves to create another, or second, gap in the infrared region at longer wavelengths off angle. Therefore, it may be preferable to also include another component which fills this second gap region off angle. Suitable gap filler components to fill this second gap include dyes, pigments, glasses, metals and multilayer films which absorb or reflect in the longer wavelengths of the infrared region.

The preceding description of the present invention is merely illustrative, and is not intended to be limiting. Therefore, the scope of the present invention should be construed solely by reference to the appended claims.

What is claimed is:

1. An infrared reflecting mirror comprising a first reflective film that reflects light in the infrared region of the spectrum while transmitting light in the visible region of the spectrum, wherein the first reflective film comprises a multilayer film comprising an optical repeating unit that comprises polymeric layers A, B and C arranged in an order ABC, the polymeric layer A having refractive indices $n_x^a$ and $n_y^a$ along in-plane axes x and y respectively, the polymeric layer B having refractive indices $n_x^b$ and $n_y^b$ along in-plane axes x and y respectively, the polymeric layer C having refractive indices $n_x^c$ and $n_y^c$ along in-plane axes x and y respectively, polymeric layers A, B and C having a refractive index $n_z^a$, $n_z^b$ and $n_z^c$ respectively along a transverse axis z perpendicular to the in-plane axes, wherein $n_x^a > n_x^b > n_x^c$, or $n_y^a > n_y^b > n_y^c$, or both $n_x^a > n_x^b > n_x^c$ and $n_y^a > n_y^b > n_{yc}$, and wherein at least one of the differences $n_z^a - n_z^b$ or $n_z^b - n_z^c$ is less than 0 or both the differences are substantially equal to 0.

2. An infrared reflecting mirror according to claim 1 further comprising a second reflective film that reflects light in the infrared region of the spectrum while transmitting light in the visible region of the spectrum, wherein the first and second reflective films are uniaxially oriented and arranged such that their axes of orientation are rotated 90° to one another, and wherein the second reflective film comprises a multilayer film comprising an optical repeating unit that comprises polymeric layers A, B and C arranged in an order ABC, the polymeric layer A having refractive indices $n_x^a$ and $n_y^a$ along in-plane axes x and y respectively, the polymeric layer B having refractive indices $n_x^b$ and $n_y^b$ along in-plane axes x and y respectively, the polymeric layer C having refractive indices $n_x^c$ and $n_y^c$ along in-plane axes x and y respectively, polymeric layers A, B and C having a refractive index $n_z^a$, $n_z^b$ and $n_z^c$ respectively along a transverse axis z perpendicular to the in-plane axes, wherein $n_x^a > n_x^b > n_x^c$, or $n_y^a > n_y^b > n_y^c$, or both $n_x^a > n_x^b > n_x^c$ and $n_y^a > n_y^b > n_y^c$, and wherein at least one of the differences $n_z^a - n_z^b$ or $n_z^b$ is less than 0 or both the differences are substantially equal to 0.

3. A method of reflecting infrared light comprising the steps of providing an infrared reflecting mirror according to claim 1 and allowing at least a portion of incident infrared light to reflect from said reflective film.

4. The method of claim 3, wherein at least 50 percent of incident infrared light having a wavelength of between 750 nm and 1600 nm is reflected.

5. A material comprising on a support a reflective film that reflects light in the infrared region of the spectrum while transmitting light in the visible region of the spectrum, wherein the reflective film comprises a multilayer film comprising an optical repeating unit that comprises polymeric layers A, B and C arranged in an order ABC, the polymeric layer A having refractive indices $n_x^a$ and $n_y^a$ along in-plane axes x and y respectively, the polymeric layer B having refractive indices $n_x^b$ and $n_y^b$ along in-plane axes x and y respectively, the polymeric layer C having refractive indices $n_x^c$ and $n_y^c$ along in-plane axes x and y respectively, polymeric layers A, B and C having a refractive index $n_z^a$, $n_z^b$ and $n_z^c$ respectively along a transverse axis z perpendicular to the in-plane axes, wherein $n_x^a > n_x^b > n_x^c$, or $n_y^a > n_y^b > n_y^c$, or both $n_x^a > n_x^b > n_x^c$ and $n_y^a > n_y^b > n_y^c$, and wherein at least one of the differences $n_z^a - n_z^b$ or $n_z^b - n_z^c$ is less than 0 or both the differences are substantially equal to 0.

6. The material of claim 5, wherein the support is transparent to visible light.

7. The material claim 5, wherein the support is glass or a plastic film.

8. A method of reflecting infrared light comprising the steps of providing a reflective film that reflects light in the infrared region of the spectrum while transmitting light in the visible region of the spectrum and allowing at least a portion of incident infrared light to reflect from the reflective film, wherein the reflective film comprises a multilayer film comprising an optical repeating unit that comprises polymeric layers A, B and C arranged in an order ABC, the polymeric layer A having refractive indices $n_x^a$ and $n_y^a$ along in-plane axes x and y respectively, the polymeric layer B having refractive indices $n_x^b$ and $n_y^b$ along in-plane axes x and y respectively, the polymeric layer C having refractive indices $n_x^c$ and $n_y^c$ along in-plane axes x and y respectively, polymeric layers A, B and C having a refractive index $n_z^a$, $n_z^b$ and $n_z^c$ respectively along a transverse axis z perpendicular to the in-plane axes, wherein $n_x^a > n_x^b > n_x^c$, or $n_y^a > n_y^b > n_y^c$, or both $n_x^a > n_x^b > n_x^c$ and $n_y^a > n_y^b > n_y^c$, and wherein at least one of the differences $n_z^a - n_z^b$ or $n_z^b - n_z^c$ is less than 0 or both the differences are substantially equal to 0.

9. The method of claim 8, wherein at least 50 percent of incident infrared light having a wavelength between 750 nm and 1600 nm is reflected.

10. An optical body comprising:

a first polymeric layer A;

a second polymeric layer B; and a third polymeric layer C;

wherein A, B, and C, are arranged in the sequence ABC, where B is contiguous to A and C; wherein A has refractive indices $n_x^A$, $n_y^A$, and $n_z^A$ for light polarized along mutually orthogonal axes x, y, and z, respectively, B has refractive indices $n_x^B$, $n_y^B$, and $n_z^B$ for light polarized along axes x, y, and z, respectively, and C has refractive indices $n_x^C$, $n_y^C$, and $n_z^C$ for light polarized along axes x, y, and z, respectively;

wherein axis z is orthogonal to layer B; and wherein the indices of refraction of layers A, B, and C are in accordance with Formula I and at least one of Formulas II and III:

$$n_z^C \geq n_z^B \geq n_z^A \quad \text{(Formula I)}$$

$$n_x^A > n_x^B > n_x^C \quad \text{(Formula II)}$$

$$n_y^A > n_y^B > n_y^C \quad \text{(Formula III).}$$

11. The optical body of claim 10, wherein the optical body comprises a plurality of repeating units having the layer sequence ABC.

12. The optical body of claim 10, wherein the optical body comprises a plurality of repeating units having the layer sequence ABCB.

13. The optical body of claim 11,
wherein A, B, and C have optical thickness ratios $f_x^a$, $f_x^b$, and $f_x^c$, respectively, along in-plane axis x, and $f_y^a$, $f_y^b$, and $f_y^c$, respectively, along in-plane axis y, and
wherein $f_x^a=1/3$, $f_x^b=1/6$, $f_x^c=1/3$, and $n_x^b=(n_x^a n_x^c)^{1/2}$ or wherein $f_y^a=1/3$, $f_y^b=1/6$, $f_y^c=1/3$, and $n_y^b=(n_y^a n_y^c)^{1/2}$.

14. The optical body of claim 11,
wherein A, B, and C have optical thickness ratios $f_x^a$, $f_x^b$, and $f_x^c$, respectively, along in-plane axis x, and $f_y^a$, $f_y^b$, and $f_y^c$, respectively, along in-plane axis y, and
wherein $f_x^a=1/3$, $f_x^b=1/6$, $f_x^c=1/3$, and $n_x^b=(n_x^a n_x^c)^{1/2}$ and
wherein $f_y^a=1/3$, $f_y^b=1/6$, $f_y^c=1/3$, and $n_y^b=(n_y^a n_y^c)^{1/2}$.

* * * * *

UNITED STATES PATENT AND TRADEMARK OFFICE
CERTIFICATE OF CORRECTION

PATENT NO. : 6,667,095 B2
APPLICATION NO. : 09/769971
DATED : December 23, 2003
INVENTOR(S) : John A. Wheatley It is certified that error appears in the above-identified patent and that said Letters Patent is hereby corrected as shown below:

<u>Column 3</u>
Line 48, delete "arc" and insert -- are --, therefor.

<u>Column 7</u>
Line 11, insert -- , -- after "$f_y^a=1/3$".

<u>Column 8</u>
Lines 64-65 (Table I, Table Heading, Col. 8 (Last Column) of Table)
delete "Sign ($N_z^b - N_z^b$)" and insert --Sign ($N_z^b - N_z^c$)--, therefor.

<u>Column 9</u>
Lines 3-4 (Table I, Table Heading, Col. 8 (Last Column) of Table)
delete "Sign ($N_z^b - N_z^b$)" and insert --Sign ($N_z^b - N_z^c$)--, therefor.

<u>Column 10</u>
Line 63, delete "and or" and insert -- and/or --, therefor.
Line 63, delete "$(n_y^{ac})^{1/2}$" and insert -- $(n_y^a n_y^c)^{1/2}$ --, therefor.

<u>Column 12</u>
Line 57, delete "and" before "incorporated".

<u>Column 19</u>
Line 65, insert -- , -- after "nickel".

UNITED STATES PATENT AND TRADEMARK OFFICE
CERTIFICATE OF CORRECTION

PATENT NO.        : 6,667,095 B2
APPLICATION NO.   : 09/769971
DATED             : December 23, 2003
INVENTOR(S)       : John A. Wheatley It is certified that error appears in the above-identified patent and that said Letters Patent is hereby corrected as shown below:

<u>Column 23</u>
Line 20,    in Claim 1, delete "$n_{yc}$" and insert -- $n_y^c$ --, therefor.
Line 47,    in Claim 2, delete "$n_z^b$" (next to "or") and insert -- $n_z^b$-$n_z^c$ --, therefor.

Signed and Sealed this

First Day of May, 2007

JON W. DUDAS
*Director of the United States Patent and Trademark Office*